US006757698B2

(12) United States Patent
McBride et al.

(10) Patent No.: US 6,757,698 B2
(45) Date of Patent: Jun. 29, 2004

(54) METHOD AND APPARATUS FOR AUTOMATICALLY SYNCHRONIZING DATA FROM A HOST COMPUTER TO TWO OR MORE BACKUP DATA STORAGE LOCATIONS

(75) Inventors: Stephen Larry McBride, North Ogden, UT (US); Russell Glen Polson, Syracuse, UT (US); Troy Davidson, Clinton, UT (US)

(73) Assignee: Iomega Corporation, San Diego, CA (US)

( * ) Notice: Subject to any disclaimer, the term of this patent is extended or adjusted under 35 U.S.C. 154(b) by 231 days.

(21) Appl. No.: 09/748,081

(22) Filed: Dec. 22, 2000

(65) Prior Publication Data

US 2002/0087588 A1 Jul. 4, 2002

Related U.S. Application Data

(63) Continuation-in-part of application No. 09/747,290, filed on Dec. 21, 2000, which is a continuation-in-part of application No. 09/533,456, filed on Mar. 23, 2000.
(60) Provisional application No. 60/208,977, filed on Jun. 2, 2000, and provisional application No. 60/129,258, filed on Apr. 14, 1999.

(51) Int. Cl.[7] .............................................. G06F 17/30
(52) U.S. Cl. ...................................... 707/204; 709/248
(58) Field of Search ........................ 707/204; 709/248

(56) References Cited

U.S. PATENT DOCUMENTS

| 5,513,314 | A | * | 4/1996 | Kandasamy et al. ........... 714/6 |
| 5,572,528 | A | * | 11/1996 | Shuen ......................... 370/402 |
| 5,694,546 | A | * | 12/1997 | Reisman ........................ 705/26 |
| 5,874,954 | A | * | 2/1999 | Kilmer et al. .............. 345/834 |
| 5,999,931 | A | * | 12/1999 | Breitbart et al. ............. 707/10 |
| 6,073,119 | A | * | 6/2000 | Bornemisza-Wahr et al. . 705/42 |
| 6,105,027 | A | * | 8/2000 | Schneider et al. ............. 707/9 |
| 6,112,239 | A | * | 8/2000 | Kenner et al. .............. 709/224 |
| 6,148,383 | A | * | 11/2000 | Micka et al. ............... 711/162 |
| 6,170,014 | B1 | * | 1/2001 | Darago et al. .............. 709/229 |
| 6,219,793 | B1 | * | 4/2001 | Li et al. ..................... 713/202 |
| 6,260,124 | B1 | * | 7/2001 | Crockett et al. ............ 711/162 |
| 6,311,232 | B1 | * | 10/2001 | Cagle et al. ................... 710/8 |
| 6,311,288 | B1 | * | 10/2001 | Heeren et al. ................. 714/4 |
| 6,343,313 | B1 | * | 1/2002 | Salesky et al. ............. 709/204 |
| 6,412,077 | B1 | * | 6/2002 | Roden et al. .................. 714/4 |
| 6,446,141 | B1 | * | 9/2002 | Nolan et al. ................... 710/8 |
| 6,493,729 | B2 | * | 12/2002 | Gusler et al. ................ 707/204 |
| 2002/0053009 | A1 | * | 5/2002 | Selkirk et al. .............. 711/162 |

* cited by examiner

Primary Examiner—Wayne Amsbury
(74) Attorney, Agent, or Firm—James T. Hagler

(57) ABSTRACT

A data file mirroring application that monitors data files stored in a source directory for archiving to at least two other backup data storage locations. Preferably, one of these backup data storage locations is on the Internet. The other may be a local data storage location, meaning a location that the host computer can access without using the Internet, e.g., a floppy drive, hard drive, high-density storage medium drive, etc. The user interface of the mirroring application flexibly allows the user to specify the source data to be backed up and the two or more backup data storage locations.

43 Claims, 23 Drawing Sheets

FIG. 22

Internet Browser

File  View  Tools  Help

Address: C:\WINDOWS\Desktop\Sundance\VB\Final\WWW\quicksyncnet_registration.html

User Information

Customer Profile

First Name: [        ]  Last Name: [        ]
Address: [        ]
Address Line #2: [        ]
City: [        ]
State: [UT ▾]
Country: [United States ▾]
E-mail: [        ]
Modem Speed: [Dial-up Modem ▾]

⎫
⎬ 531
⎭

Account Security

User Name: [        ]
Password: [        ]
Confirm Password: [        ]

⎫
⎬ 532
⎭

Please type a question that will remind you of the password you have chosen.

Password Hint: [        ]

[Submit]   [Reset]
   533       534

METHOD AND APPARATUS FOR AUTOMATICALLY SYNCHRONIZING DATA FROM A HOST COMPUTER TO TWO OR MORE BACKUP DATA STORAGE LOCATIONS

CROSS-REFERENCE TO RELATED APPLICATIONS

This application is a continuation-in-part of three prior U.S. patent applications and claims priority therefrom. Specifically, the present application claims priority under 35 U.S.C. § 120 from (CIP 1), entitled "Method and Apparatus for Automatically Synchronizing Data to Electronic Devices Across a Communications Network," filed Dec. 21, 2000, application Ser. No. 09/747,290 filed Attorney Docket Number P0621. CIP1, in turn continuation-in-part under 35 U.S.C. § 120 from U.S. patent application Ser. No. 09/533,456 filed Mar. 23, 2000, entitled "Method and Apparatus for Automatically Synchronizing Data to Destination Media" now pending. U.S. patent application Ser. No. 09/533,456, in turn, claims priority from an earlier U.S. Provisional Patent Application No. 60/129,258, filed Apr. 14, 1999, entitled "Storing Revisions of Files on Removable Media Based on a Serial Number." The present application also claims priority under 35 U.S.C. § 119 from U.S. Provisional Patent Application No. 60/208,977, filed on Jun. 2, 2000, entitled "Data Synchronization Within a Universe Defined to Include a Plurality of Nodes."

All of the previous applications enumerated above are entirely incorporated herein by reference. Additionally, all the previous applications enumerated above are assigned to and commonly owned by the Assignee of the present application.

FIELD OF THE INVENTION

The present invention relates to the field of electronic data storage and data backup. Specifically, the present invention relates to a system for archiving user files, and more particularly, to a system for automatically and periodically archiving user files to a selected destination media or device across a communications network.

BACKGROUND OF THE INVENTION

In an information-driven society, data, particularly data stored in electronic form, may be extremely valuable. People in almost all industries spend tremendous amounts of time working on computers to generate documents, reports, graphics, works of art, etc. This work, stored in electronic form, may be critically important to the user who created it. Consequently, protecting that data is also critically important.

There are many types of potential disasters that may threaten a user's data. While most users envision disasters caused by flood or fire, more common scenarios are software glitches and hardware damage caused by physical or electric shock, or minor exposure to liquid. In such cases, that data or the ability to access the data may be irreparably destroyed.

One primary means of protecting data against such disasters is to make and maintain a backup copy of the data. A great virtue of electronically-stored data is the ability to quickly make a near perfect copy of the data. The copy of the data can be maintained away from the computer on which it was created, e.g., on another computer or on a removable data storage medium so that if a problem occurs with the original copy of the data, the backup copy can be used to recover the important data.

Similarly, the original copy of the data stored on the computer's hard disk may be undamaged. However, because of a software or hardware malfunction on that computer, the data may be inaccessible until the software is fixed and/or the damaged hardware is replaced. If the user cannot wait for repair, the user can use another computer and access the backup copy of the data which may be nearly as current as the inaccessible data on the hard disk. In this way, the user is able to avoid the problems that would be caused by complete lack of access to the data at a critical time.

The key to a successful backup strategy is performing backups often enough that the backup copy of important data is current (i.e., identical to the original copy) or nearly current, so as to be able to serve in place of the original copy of the data with minimal difficulty if something happens to that original copy. Also, the backup media should be reliable and preferably sized to store an entire backup copy of the data on a single piece of storage media. However, conventional backup utilities are often difficult to use and may have proprietary or incompatible formats.

Moreover, high capacity backup media, such as computer tape, requires a dedicated backup device (e.g., a tape drive). If the main system malfunctions and the data on the tapes must be accessed, the alternative or replacement computer used may not have a corresponding tape drive for reading the backup tape. The same problem may occur with any high capacity backup media. Because high capacity backup media generally require a dedicated drive, the available functioning computers to which a user may turn may not have had the necessary dedicated drive installed.

The backup copy of the data can be stored on conventional floppy disks. However, because floppies are not a high capacity data storage media, a large number of floppy disks may be required, and the backup process may consume hours of time.

Additionally, backup utilities do not generally facilitate the automatic mirroring of data between devices, especially in a flexible and user definable manner. For example, a user may have a first computer in one location such as a home and a second computer in another location such as a business. The user would like changes to certain files on the first computer to be mirrored to corresponding files stored on the second computer. In addition, perhaps, the user would like changes to files on the second computer to be mirrored to corresponding files on the first computer. To accomplish this, the user must generally remember to carry or transmit updated files back and forth between the first and second computers.

As another example, the user may have a communications management program on each of the first and second computers. Each communications management program maintains files of contacts and related information including telephone numbers. In addition, the user may also have a mobile telephone with an electronic telephone number directory stored therein. The user may want changes to the mobile telephone's directory to be mirrored to the files of the communications management programs on the first and second computers. In addition, the user may also want changes to the filed of the communications management program on either computer to be mirrored to the other computer and to the mobile telephone's directory. In the past, the user has been required to manually input, carry or transmit the updated data from one device to another.

Consequently, there is a need in the art for a system that simplifies the backup/archive process and provides adequate protection of important data. There is also a need for the backup to be made to a storage medium in a format that is compatible with other computers. Further, there is a need for the backup process to facilitate automatic mirroring of data between devices, including different computers and other types of electronic devices.

SUMMARY OF THE INVENTION

The present invention meets the needs in the art described above. Specifically, the present invention provides a system that simplifies the backup/archive process and provides adequate protection of important data. The present invention also provides a backup process with automatic mirroring of data between devices, including different computers and other types of electronic devices, via a communications network. Other novel features and advantages of the present invention may be discovered by those skilled in the art by reading this text and practicing the invention described herein.

In a preferred embodiment, the present invention may be described as a system for backing up electronic data files that includes: a host computer running a mirroring application; a connection between the host computer and the Internet; and a user interface of the mirroring application, where the user interface includes controls for specifying source data. The mirroring application monitors the source data for change and, upon detecting changes to the source data, copies the source data to a backup data storage location accessed by the host computer via the Internet. Additionally, the mirroring application, upon detecting changes to the source data, also copies the source data to a local backup data storage location.

The local backup data storage location may be a removable storage media in a removable storage media drive. Alternatively, the local backup data storage location may be a hard drive in the host computer or in a computer networked to the host computer.

Preferably, the user interface includes controls for specifying the local backup data storage location. The user interface may also specify the available storage capacity of the local backup data storage location.

Preferably, the user interface also includes schedule controls for specifying how often the mirroring application checks the source data for change and, upon detecting changes to the source data, copies the source data to the backup data storage location accessed via the Internet. The schedule controls may include controls for specifying a time interval at which the mirroring application checks the source data for change and, upon detecting changes to the source data, copies the source data to the backup data storage location accessed via the Internet. Alternatively, the schedule controls may include controls for specifying at least one day of the week and time of day at which the mirroring application checks the source data for change and, upon detecting changes to the source data, copies the source data to a backup data storage location accessed via the Internet.

In an alternative embodiment that does not necessarily make use of Internet-based storage, the present invention may be described as a system for backing up electronic data files including: a host computer running a mirroring application; and a user interface of the mirroring application, where the user interface includes controls for specifying source data. The mirroring application monitors the source data for change and, upon detecting changes to the source data, copies the source data to two or more backup data storage locations. Preferably, the user interface of the mirroring application includes controls for specifying the two or more backup data storage locations.

One of the backup data storage locations may be a removable storage media in a removable storage media drive. One of the backup data storage locations may be a hard drive in the host computer or in a computer networked to the host computer. Preferably, the user interface specifies the available storage capacity of available backup data storage locations. As before, the user interface may include schedule controls for specifying how often the mirroring application checks the source data for change and, upon detecting changes to the source data, copies the source data to the backup data storage locations.

In addition to the systems described above, the present invention also encompasses the mirroring applications that function as described above in connection with the systems embodied according to the present invention. Specifically, the present invention encompasses a mirroring application for backing up electronic data files, the application being written to run on a host computer with a connection between the host computer and the Internet. The application includes: a mirroring function for mirroring specified source data to a backup data storage location; and a user interface, where the user interface includes controls for specifying the source data by file or folder. The mirroring application monitors the source data for change and, upon detecting changes to the source data, copies the source data to the backup data storage location. The backup data storage location may be accessed by the host computer via the Internet. The mirroring application, upon detecting changes to the source data, also copies the source data to a local backup data storage location.

The present invention also encompasses the methods of making and using the systems and applications described above. For example, the present invention encompasses a method of backing up electronic data files with a mirroring application running on a host computer connected to the Internet. The method is performed by specifying source data by file or folder with a user interface; monitoring the source data for change; and, upon detecting changes to the source data, copying the source data to a backup data storage location accessed by the host computer via the Internet. In an alternative method, the Internet may not be used to reach a backup data storage location. This second method of the present invention is performed by specifying source data by file or folder with a user interface; monitoring the source data for change; and, upon detecting changes to the source data, copying the source data to two or more backup data storage locations.

BRIEF DESCRIPTION OF THE DRAWINGS

The preferred embodiments of the present invention are better understood when explained in conjunction with the appended drawings. For the purpose of illustrating the invention, there is shown in the drawings embodiments of the invention that are presently preferred. It being understood, however, that the invention is not limited to the specific embodiments, methods and instrumentalities illustrated. Throughout the drawings, identical reference numbers are used to indicate identical elements.

FIGS. 20–27 are exemplary screen shots of the display provided during a preferred installation process of a mirroring application according to the present invention.

DETAILED DESCRIPTION OF THE PREFERRED EMBODIMENTS

The present invention encompasses a system and method for automatically mirroring data files among a number of computers or other electronic devices that are connected by a communications network. As used herein, the term communications network refers generically to both wired and wireless systems of transferring data between two or more electronic devices.

The preferred embodiment includes an application for mirroring data files saved at a first storage location (which may be on a fixed or removable data storage medium) to a destination storage location (which may also be a fixed or removable data storage medium). The destination storage location may be in a separate electronic device connected to the first storage location by a communications network. This mirroring is performed primarily for archival purposes and disaster recovery. The backup application of the present invention preferably runs in the background to periodically "mirror" user files to the backup storage destination.

The following text will first discuss embodiments of the present invention in which data files are mirrored from a first data storage location (e.g., a directory on a fixed or removable media drive) to a second data storage location on a removable data storage medium that is local to the first data storage location. Thereafter, the text will describe embodiments of the present invention in which data is mirrored from a first data storage location to one or more second data storage locations which are in separate electronic devices and connected to the first data storage location by a communications network. Many of the principles of operation, features, details and functionality of the local media embodiments (FIGS. 1–13) are applicable and used in the embodiments for mirroring data to a different device (FIGS. (14) –17).

It will be readily understood by those skilled in the art that the components of the various exemplary embodiments, as described in this text and illustrated in the corresponding Figures, could be arranged and designed in a wide variety of different configurations. The following detailed description of the preferred embodiments of the present invention is not intended to limit the scope of the invention to the specific embodiment disclosed.

Figure 1:
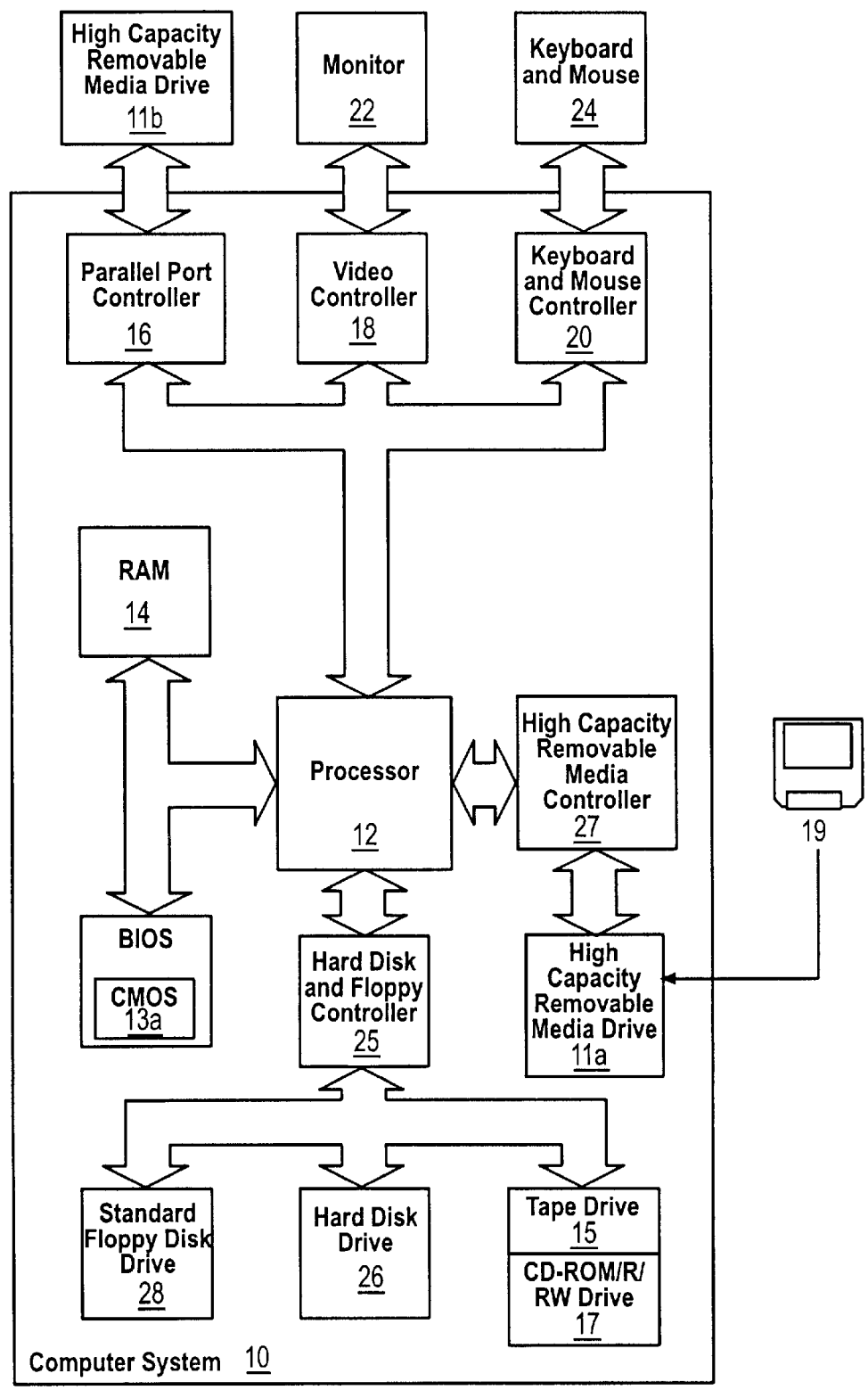
FIG. 1 is a block diagram of a computer system that includes a high capacity removable disk drive with which the present invention may be implemented.
Figure 2:
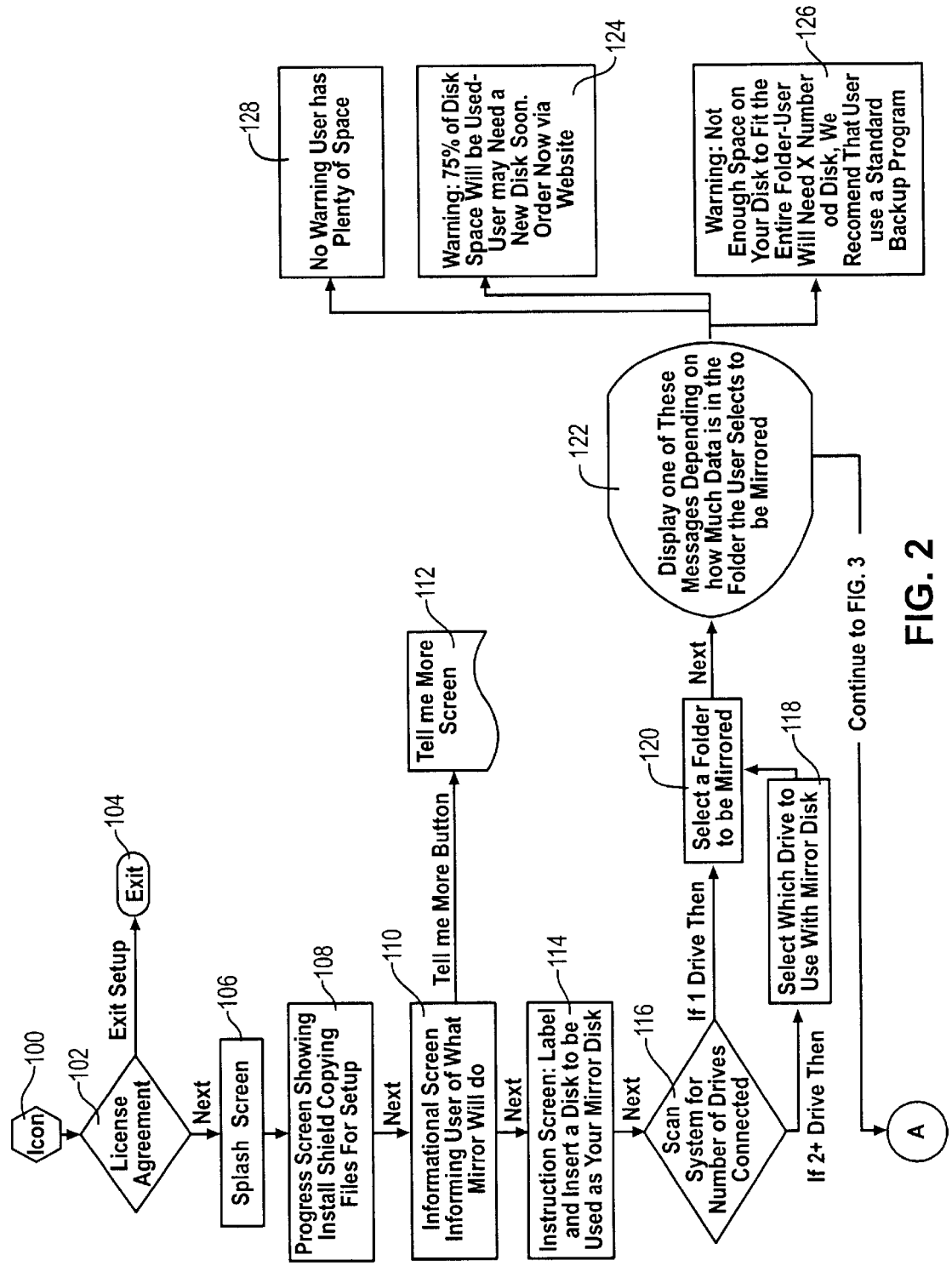
FIGS. 2–3 are flow charts illustrating the processes performed by an installation application of the present invention.

Referring now to FIG. 1, there is illustrated a block diagram of an exemplary computer system (10). As shown, the computer system (10) is divided between internal and external components. The internal components include a Basic Input/Output System ("BIOS") (13) and a processor or Central Processing Unit ("CPU") (12) that control the overall functioning of the computer system (10). A memory (14), a hard disk drive (26), a floppy disk drive (28), a tape drive (15), a CD-ROM/R/RW drive (17), and a high capacity removable media drive (11a) are also preferably connected to the CPU (12).

Typically, an IBM-compatible computer system or personal computer ("PC") (10) employs the Windows® 95 or Windows® NT operating systems (available from Microsoft® Corp., Redmond, Washington) and includes a BIOS (13) that supports a configuration in which floppy disks have a capacity of 720 k to 1.44 MB are floppy disk drives are assigned drive letters a: and b:. The BIOS (13) also provides for fixed disks which are assigned drive letters c:, d: and so on, and are configured with a cylinder, head and sector number that relates to the capacity of the drive.

The typical BIOS (13) in a computer system supports booting (i.e., starting the system) by reading data only from drives a: and c:. It is preferable, however, that the BIOS (13) supports a configuration in which a high capacity removable media drive (11a) or (11b) may be assigned drive letter a: such that the computer system (10) may be booted from the high capacity removable media drive (11a) or (11b). The high capacity removable drive (11a) or (11b) operates to read and/or write to a high capacity storage media contained within a removable storage cartridge (19).

A removable high capacity media controller (27) serves as an interface between the removable media drive (11a) and the CPU (12). For example, the high capacity removable disk controller (27) may comprise a Small Computer System Interface (SCSI) or Integrated Drive Electronics (IDE) interface controller. A hard and floppy disk controller (25) serves as an interface between the CPU (12) and a number of drives that may be provided including, for example, a hard disk (26), a CD-ROM/R RW drive (17), a floppy disk drive (28) and a tape drive (15). It will be appreciated by those skilled in the art that the drive controller (25) may comprise separate floppy and hard disk controllers (e.g., IDE or SCSI controller), and that the high capacity removable media drive (11a) may also utilize the drive controller (25) as an interface to the CPU (12).

An exemplary high capacity removable media drive is the Zip® drive manufactured by Iomega Corporation of Roy Utah. Further disclosure on an exemplary high capacity removable media drive, as contemplated by the present invention, was made in U.S. patent application Ser. No. 08/651,321, filed on May 21, 1996, the disclosure of which is incorporated herein by reference in its entirety. In the exemplary embodiment in application Ser. No. 08/651,321, an IDE high capacity removable media drive (11a) is described which may comprise several sub-components, including: a 40 pin IDE bus connection; a CPU, for example, an 8052; a 1 k Data RAM memory for executing local programs; a 32 k ROM memory for storage programs, a controller circuit, such as an AIC-7166 manufactured by Adaptec, which controls buffer management of data to and from the media, media interface, and processor interface via the IDE bus; a Timing Processor for providing timing signals to the servo motors and the read/write channel; motor control circuitry; an RLL encoder for writing data to the media; and an RLL decoder for reading data from the media.

The high capacity removable media drive (11a) or (11b) illustrated in FIG. 1 is preferably capable of communicating with the removable high capacity media (IDE) controller card (27) via cylinder, head, and sector mode (hereinafter CHS mode) or logical block address mode (hereinafter LBA mode). In CHS mode, the controller card (27) receives data logically specifying a cylinder, head and sector from which data on the media (19) is desired. The drive (11a) translates this information to a physical cylinder, head and sector designation to retrieve the specified data from the media (19). The cylinder, head and sector information recorded in the CMOS (13a) defines the logical number of cylinders, heads and sectors on the drive and defines the translation used by the drive (11a) to determine where to physically retrieve the specified data on the media (19). In LBA mode, the controller card (27) communicates with the drive (11a) through a linear mapping of sectors, starting at sector 0 and continuing to the last sector depending on the capacity of the drive.

Other controllers are connected to the CPU (12) to provide an interface between a variety of external devices and the CPU (12). For example, a parallel port controller (16) may be used to connect the CPU (12) to, for example, a high capacity removable media drive (11b) or a peripheral such as a printer (not shown). A monitor controller (video card) (18) may be used to connect the CPU (12) to a monitor (22). And, a keyboard and mouse controller (20) may provide an interface between the CPU (12) and a keyboard and mouse device (24). The exemplary computer system (10) of FIG. 1 is configured with two high capacity removable media drives (11a) and (11b) to emphasize that a high capacity removable media drive can be implemented in either internal or external form.

As noted above, the present invention is directed to a document mirroring application that allows users to easily and effortlessly keep an up-to-date backup of their key files on removable media or fixed media at different and/or remote data storage locations. The application of the present invention is preferably compatible with all types of high capacity removable media drives (11a and 11b). Such exemplary high capacity media drives include, but are not limited to, Iomega® Zip®, Iomega® Jaz®, Iomega® Clik!™, CD-RW drives, etc. Commercially available embodiments of the mirroring application of the present invention will preferably run on PC based systems running Windows® 95 Windows® 98, Windows NT® and Windows® 2000. Commercially available embodiments of the present invention will also preferably run on Apple® Macintosh® computers running the Mac® OS v.7+. The software of the present invention is preferably localized and, in particular, includes user-selectable versions in English, Japanese, French, German and Spanish languages.

Installation Process

A brief overview of the installation process follows. Upon launching installation software for the mirroring software of the present invention, the user is provided an option to install the mirroring application software or view software tutorials. For example, the user may be provided with an explanation and promotion of the mirroring software and an animated tutorial. "Wizards" will preferably walk the user through the installation in a step-by-step fashion. The installation software will automatically detect the desired language based on the language of the operating system, i.e., the software will detect if the computer's operating system is using English, Spanish, Japanese, etc. If the operating system language is not supported, the software will prompt the user to select a language from among a list of supported languages. The installation software will also detect the operating system, set configuration options, and install the correct version of the mirroring software to a selected destination directory.

Referring now to FIGS. 2, 3 and 5–10, the process of installing the mirroring application software will be described in greater detail. As noted above, it is preferable that a setup "wizard" step the user through the process of installing the mirroring application. Wizards are well known to those of ordinary skill in the art. It is noted that the user may click Cancel, Next, Back and Tell me more . . . (i.e., help) buttons at any point during the installation process.

The process begins when the user clicks an installation icon (or selects an executable file (.exe) from, e.g. Windows® Explorer) step (100) and is provided a confirmation screen to begin the installation of the mirroring software. After clicking a "Next" button, a license agreement is displayed step (102). If the user does not accept the license, the installation software exits at step (104). Otherwise the installation continues at step (106) where a splash screen is displayed and files are copied at step (108) in preparation for the installation. It is preferable that InstallShield® or similar software be used for the installation process The user may also be asked to electronically register the software. At step (110), the user is provided with an informational display, such as the exemplary display of FIG. 5. Again, the user may click the "Tell me more . . . " button to obtain help (step 112). If at step (110) the installation software is unable to determine a language to use, the user will be prompted for a language.

Figure 6:
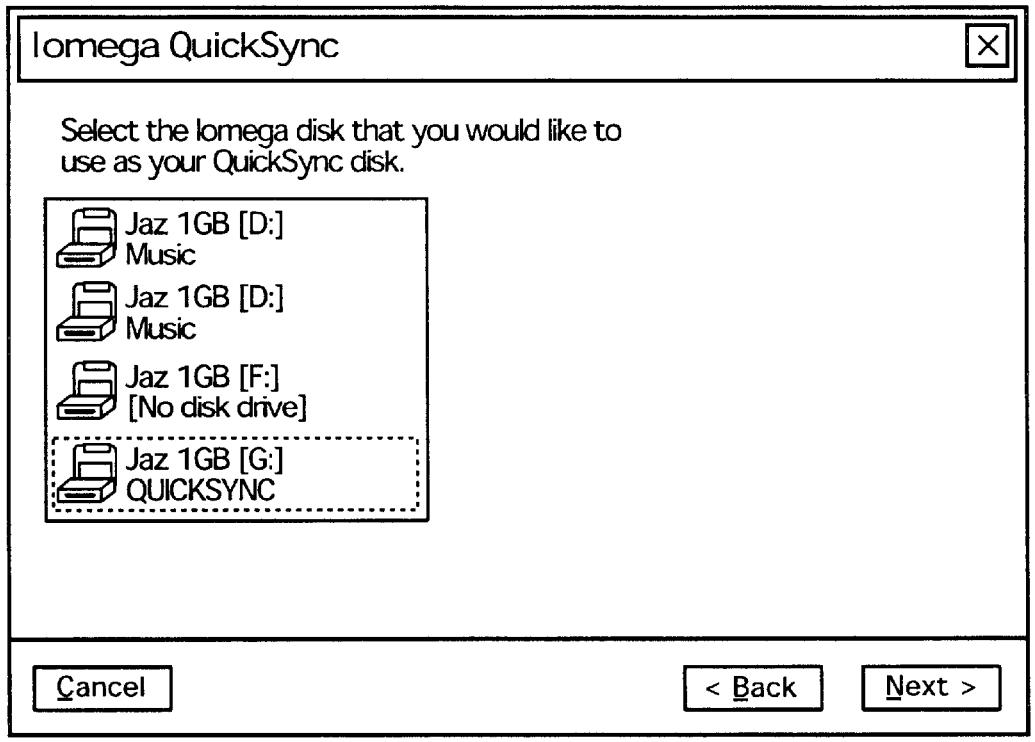

At step (114), a display such as the exemplary display of FIG. 6 is provided to the user. The user then indicates the particular removable media (and associated media drive) that is to be used as the backup data storage location, (e.g. the mirror disk). It is preferable that intelligent defaults are provided to the user from which the user can select the backup data storage location. Such defaults, for example, "Zip 100 (G:))" are illustrated in FIG. 6. The user may be instructed to label the disk selected in FIG. 6 as the "mirror disk."

Figure 7:
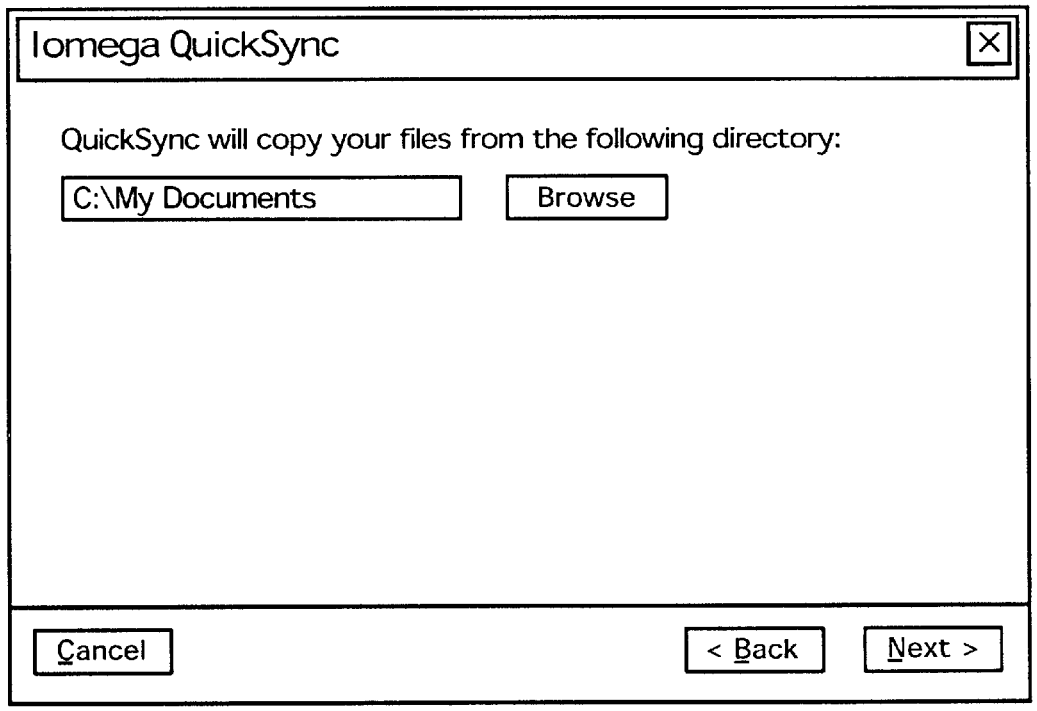
Figure 8:
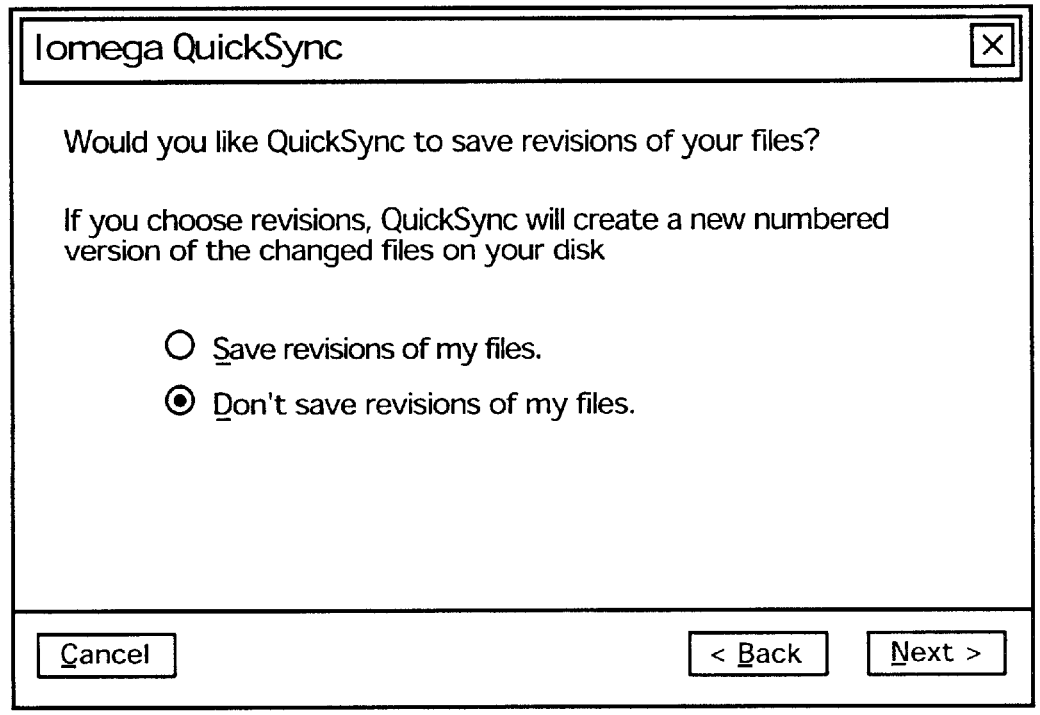
Figure 9:
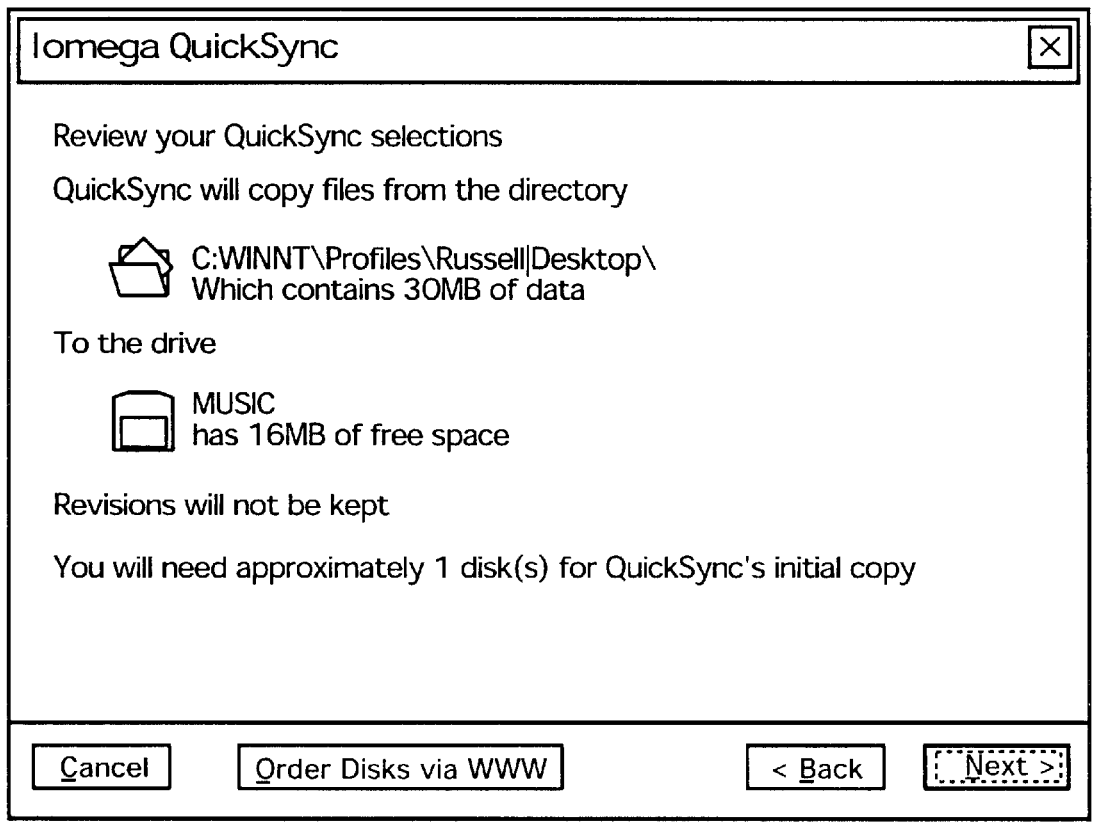

At step (116), the user's computer system (10) is scanned for other drives (e.g., hard disk drives (26) or other removable media drives (11a)). Then, at step (120), the user is asked to select a source folder (directory) to be mirrored to the backup data storage location or mirror disk. FIG. 7 illustrates an exemplary screen which prompts the user to input the source folder and allows the user to browse available folders from which the source folder can be selected. If there is more than one hard disk, logical partition or data storage drive configured in the user's computer system (10), the user may first be prompted to select a drive at step (118) containing the source folder (the original data storage location), and then prompted for the source folder at step (120).

At step (122), in accordance with the amount of data stored within the source folder selected at step (120), the user is provided with a message that:
  (1) the source folder will occupy more than 75% of the destination disk at step (124); the user may then be reminded that additional disks are available for purchase in local outlets or on a predetermined Web site step;
  (2) the source folder will not fit on the destination or mirror disk step (126); or
  (3) No message at step (128) meaning that the destination or backup data storage location has sufficient capacity to receive the mirrored data from the source folder.

Figure 3:
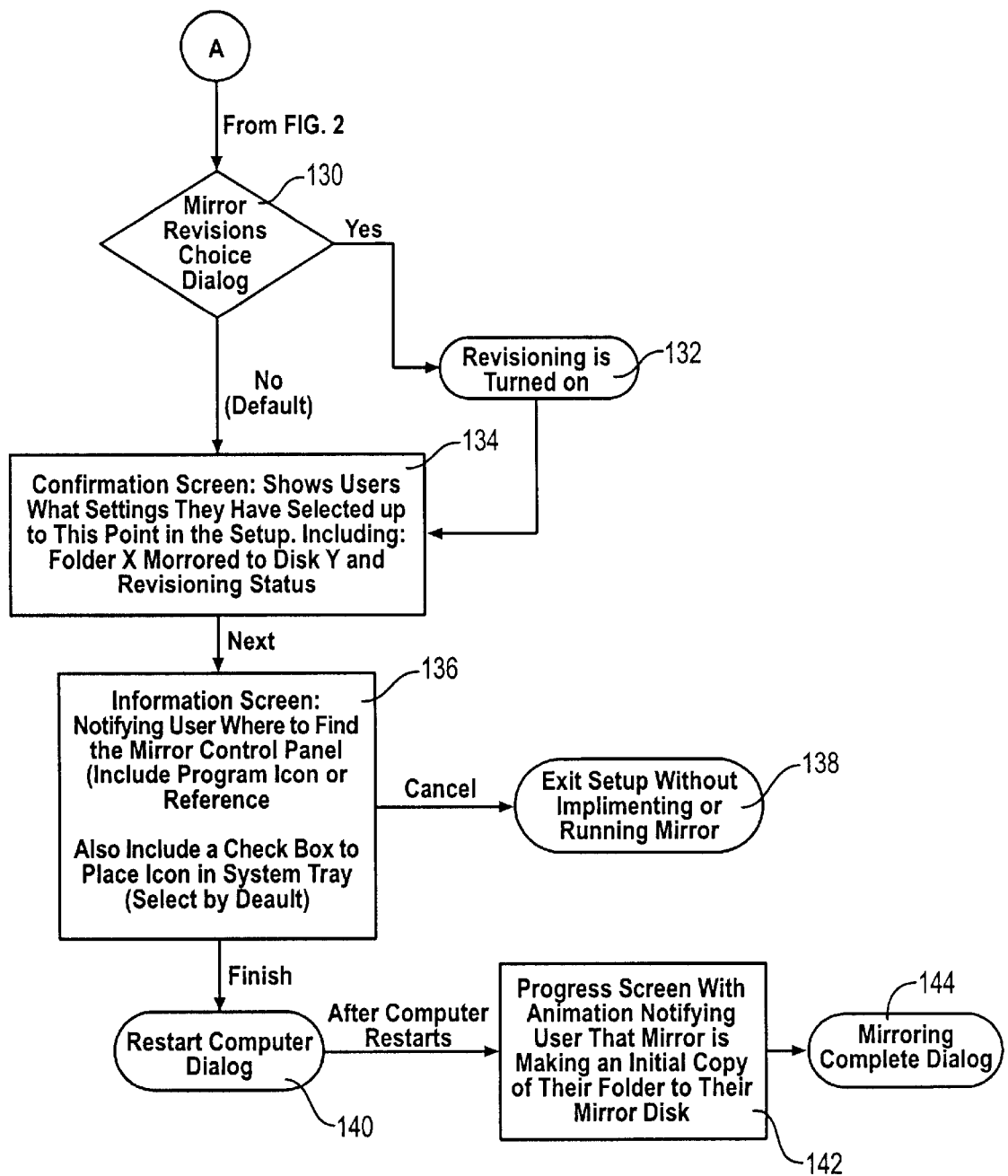

Moving to FIG. 3, at step (130), the user is prompted to determine if revisions of files are to be mirrored. A screen such as the exemplary screen of FIG. 8 may be provided for the user to input a response. In particular, the mirroring software may make backup copies based on a predetermined period of time elapsing and/or if a file has been revised and saved. If revisions are to be mirrored, revisioning is turned on at step (132). In either case, processing continues at step (134) where a confirmation screen is presented to the user, such as the exemplary screen illustrated in FIG. 9. The confirmation screen presents all of the user's selections on one screen prior to initiating the actual installation process.

In accordance with present invention, the mirror disk is identified by a unique identifier contained on the media. Referring to FIG. 1, the computer system (10) may query the particular piece of media (19) for the media's unique identifier during the installation process. By way of a non-limiting example, the media (19) may comprise a ZIP® disk manufactured by Iomega Corporation of Roy, Utah. Each Iomega® ZIP® disk contains a unique serial number that is written to a predetermined track during the formatting process and which may be used as the unique identifier. Further, while the media (19) has been described in terms of a ZIP® disk, it is not limited to the ZIP® disk, as the use of other removable and permanent media types having a unique identifier is within the scope and spirit of the present invention. Such media include, but are not limited to, CD-RW, DVD-RAM, and other removable floppy and hard disks.

The system (10) may query the media (e.g., 19) using an application programming interface (API) such as the Iomega Ready™ API, or other suitable method. The Iomega Ready™ API, when invoked, causes the media drive to read the unique serial number from the predetermined track by using the SCSI 0x06 Non-Sense Command. In particular, by invoking the Disk Status Page (page 0x02) of the Non-Sense Command, the media serial number may be determined by reading offset bytes 20–59 of the returned data structure. Exemplary source code for obtaining the unique identifier in conjunction with an Iomega® ZIP® drive and disk is as follows:

```
void CClientApp::GetZipDrive ()
{
    int j,k;
    m_DriveNum = 0;
    for(j = 0;j<26;j++)
        // scan the drives and find the IOMEGA drives
    {
        if(IsIomegaDrive(j))
        {
            k = GetGeneralDevType(j);
            if(k = DRIVE_IS_ZIP)
            {
                m_DriveNum = j;
                j = (26);
            }
        }
    }
}
voidCClientApp::GetSerialNumber()
{
    unsigned char szBuffer[1024];
    memset(szBuffer,0,sizeof(szBuffer));
    memset(&m_SerialNumber,0,.40);
    GetInfoNonSense(m_DriveNum,0x02,szBuffer);
    memcpy(&m_SerialNumber,&szBuffer[22],39)'
}
```

It will be understood by those skilled in the art that the unique identifier is not limited to information stored on the media (19) such as the serial number, and that other types of information could be used as the unique identifier. In addition, the unique identifier should contain a sufficient number of bits (length) to ensure that no two pieces of media have the same identifier. For example, each Iomega® ZIP® disk contains a unique 39 byte (312 bits) serial number, and other bit lengths may be utilized.

Figure 10:
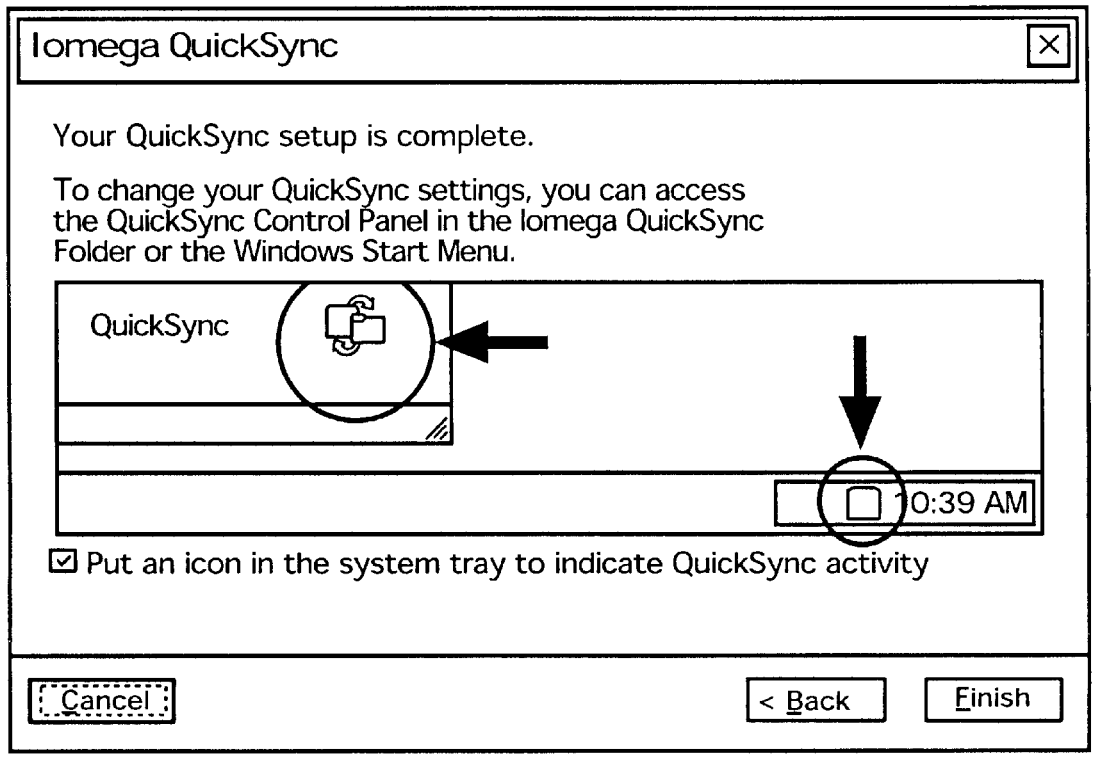
Figure 11:
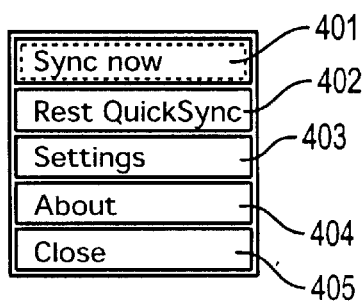
FIGS. 11–13 are exemplary screen shots of the displays provided during the monitoring process illustrated in FIG. 4.

At step (136) an information screen, such as the exemplary screen illustrated in FIG. 10, is presented to notify the user where the mirror application control icon may be found. The user is provided with an opportunity to cancel the installation at step (138). If the user continues with the installation, the user is prompted to restart the computer at step (140) to complete the installation after the mirror application components are copied to the destination directory.

After the computer restarts, the source folder selected at step 118 is initially copied to the mirror disk and the installation is completed. During this initial copying, at step (142) a progress screen may be displayed, preferably with animation, to notify the user that the mirror application is making an initial backup copy of the designated source folder to the designated destination drive, location or mirror disk. A dialog box indicating the completion of the initial mirroring may then be displayed in step (144). The mirror application is then fully installed and operating as will be described in more detail below.

Monitoring Operation

Some of the virtues of the present invention are simplicity of use and no required user intervention unless the mirror disk is needed or full. The mirror application of the present invention preferably loads whenever the computer system (10) is booted or when a particular user logs onto the system (10). The application monitors the source directory in accordance with the user-selected options. An animated icon will show the current status of the mirror application by appropriately indicating any of the following: a data copy operation is being performed, no mirror disk available, system is monitoring the source directory, and application disabled. For Windows® based PCs, the animated icon will preferably be in the system tray. For Macintosh® computers, the animated icon will preferably be in the menu bar.

When a change occurs to the data in the selected source folder or directory, the mirror application will copy the changed data file to the designated backup storage location, e.g. the mirror disk. The mirroring may be performed after a predetermined lapse of time between synchronizations and/or when a revision of the source data file is saved.

Figure 4:
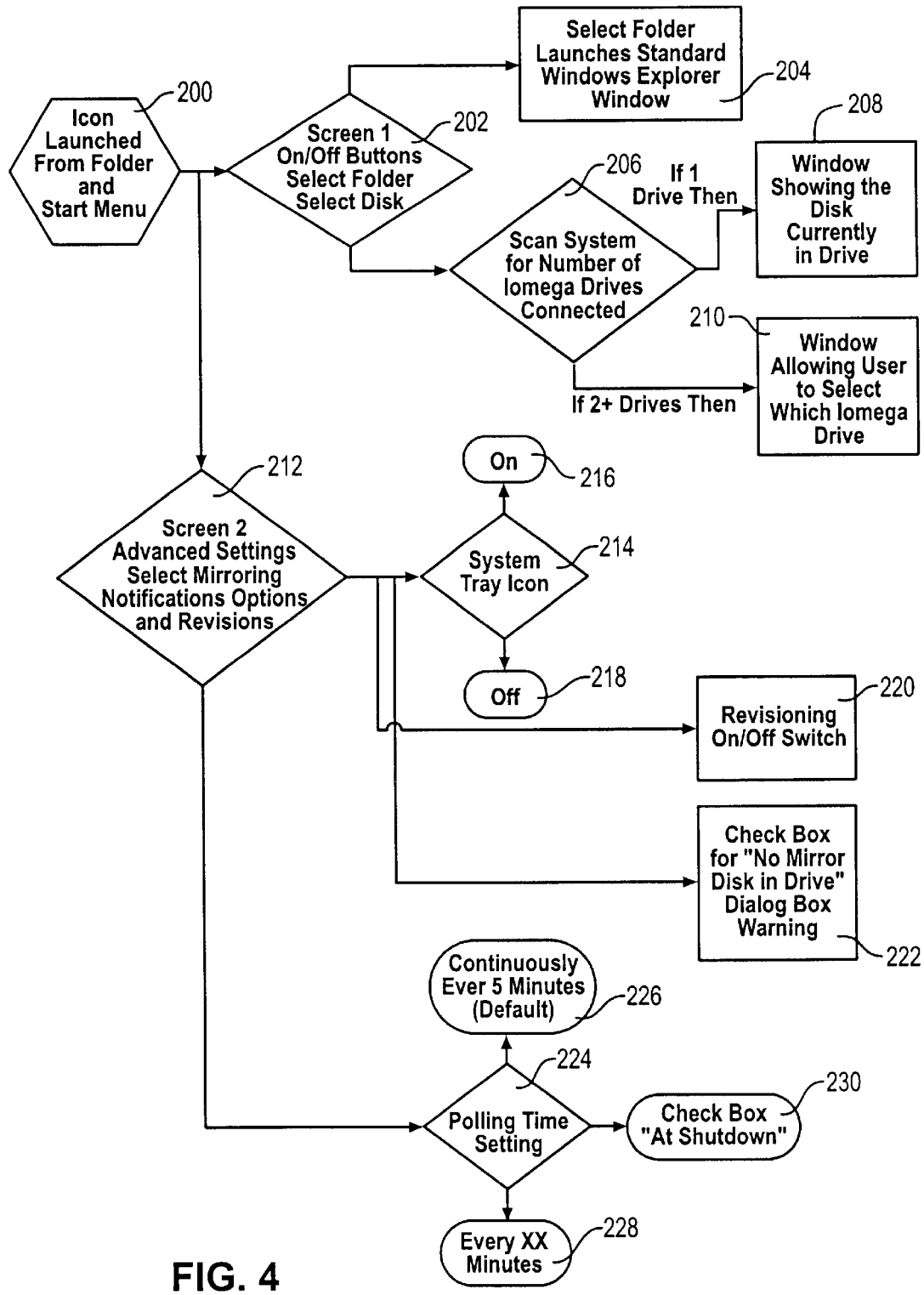
FIG. 4 is a flow chart illustrating the processes performed by a monitoring application of the present invention.
Figure 5:
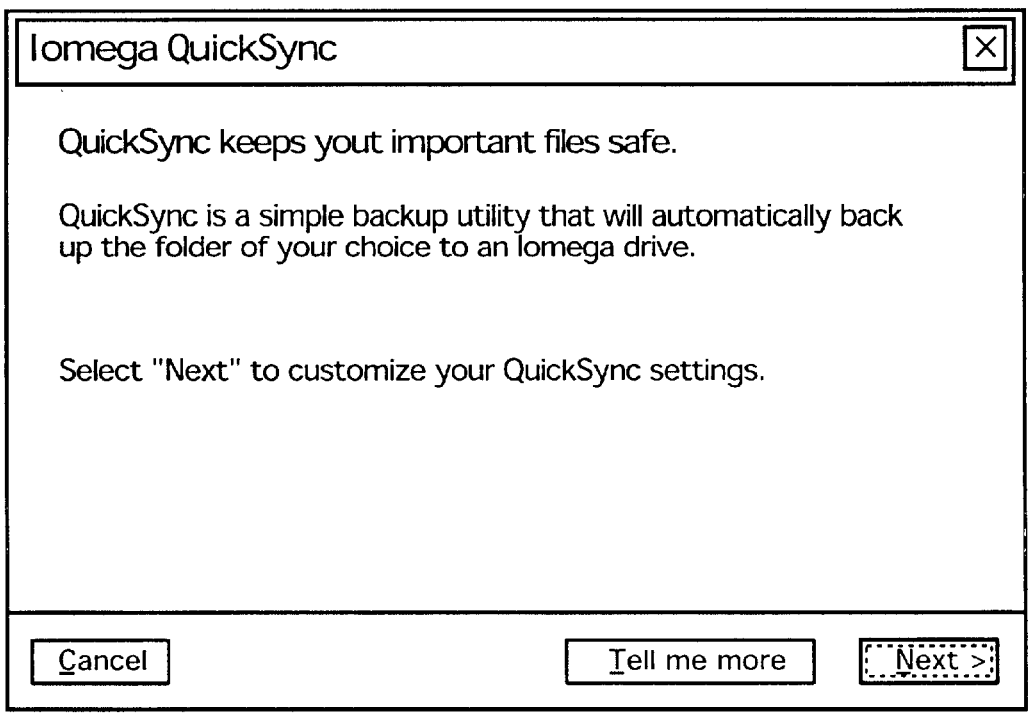
FIGS. 5–10 are exemplary screen shots of the displays provided during the installation process illustrated in FIGS. 2–3.

As shown in FIG. 4, the user may reconfigure the mirror application operation at any time by launching the application icon from, e.g., the Start Menu or System Tray step (200). By clicking on the System Tray icon, a menu is displayed to the user, such as that in FIG. 11. The user may force a synchronization of the selected source directory the designated backup storage location, e.g. the mirror disk, by selecting the "Sync now" button (401). The user may reset the mirror application by selecting the "Reset Quik Sync" button (402). The user may access and change the settings of the mirror application by selecting the "Settings" button (403). And, the user may obtain information on the mirror application by selecting the "About" button (404) or close the mirror application by selecting the "Close" button (405).

Figure 12:
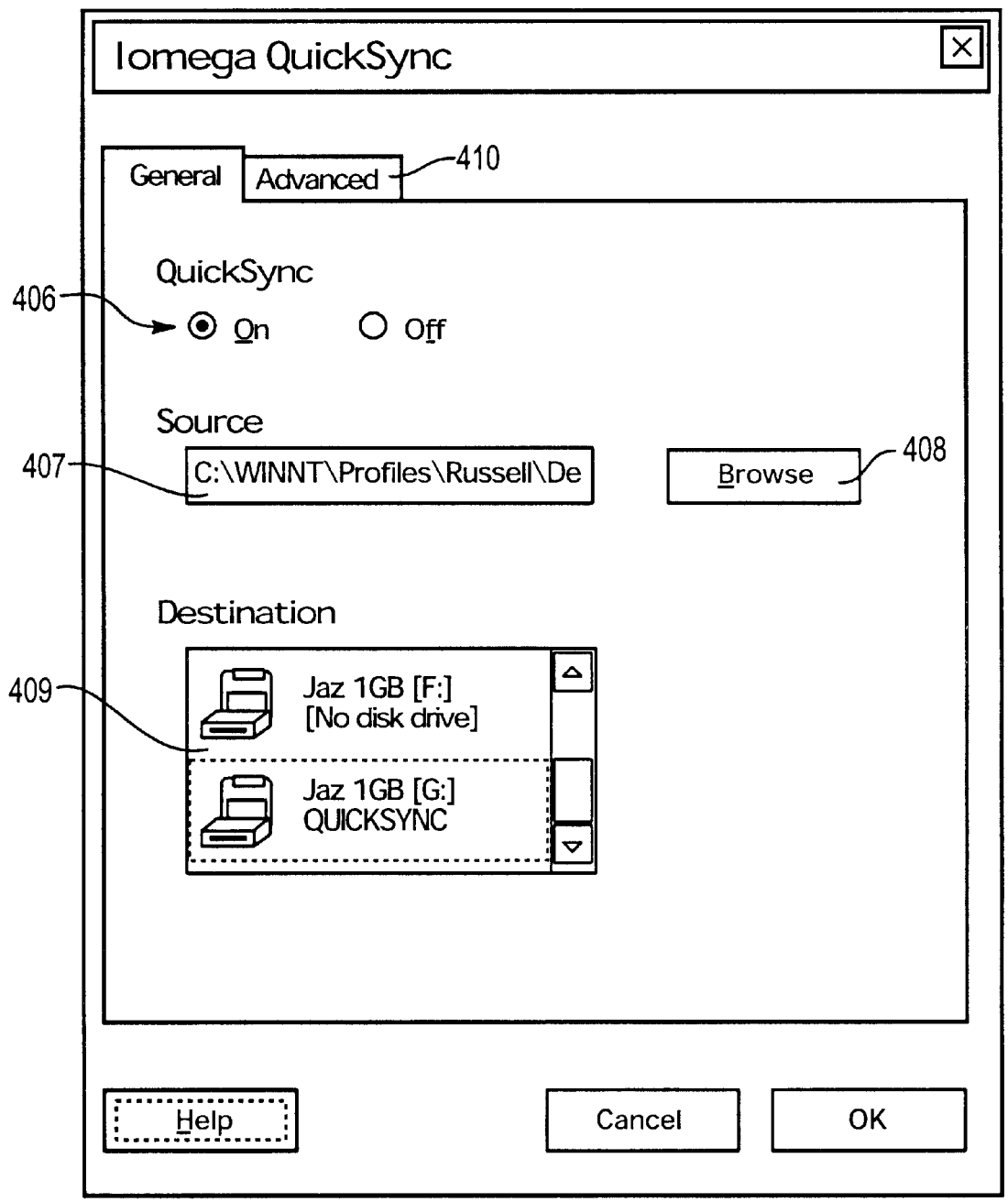

If the user chooses "Settings," then the general settings tab will be displayed at step (202) in FIG. 4. An exemplary general settings display is illustrated in FIG. 12. From the general settings display, the mirror application can be turned on or off using the "QuikSync" radio buttons shown in FIG. 12. The source folder and destination backup storage location can also be controlled from the general settings display of FIG. 12. The source folder is specified in the field (407) of the display. The user may also activate a browse feature (408) to browse for the desired source folder. A list of available destination drives (409) can be displayed from which the user can select a designated backup data storage location.

From step (202) in FIG. 4, the user can change the designated source folder in step (204). The browse features (408) may make use of Windows® Explorer to assist the user in locating and selecting the desired source folder. Alternatively, from step (202), the user can designate the destination drive or mirror disk where the source data is to be backed up. In step (206), the mirror application scans the system for possible backup data storage locations, particularly high capacity media drives such as Iomega® Zip®, Iomega® Jaz®, Iomega® Clik!™, CD-RW drives, etc. If only one such possible backup data storage location is available, that location will be displayed in the list (409) in step (208). If two or more such backup data storage locations are available, all will be listed (409) and the user can select the desired destination in step (210).

Figure 13:
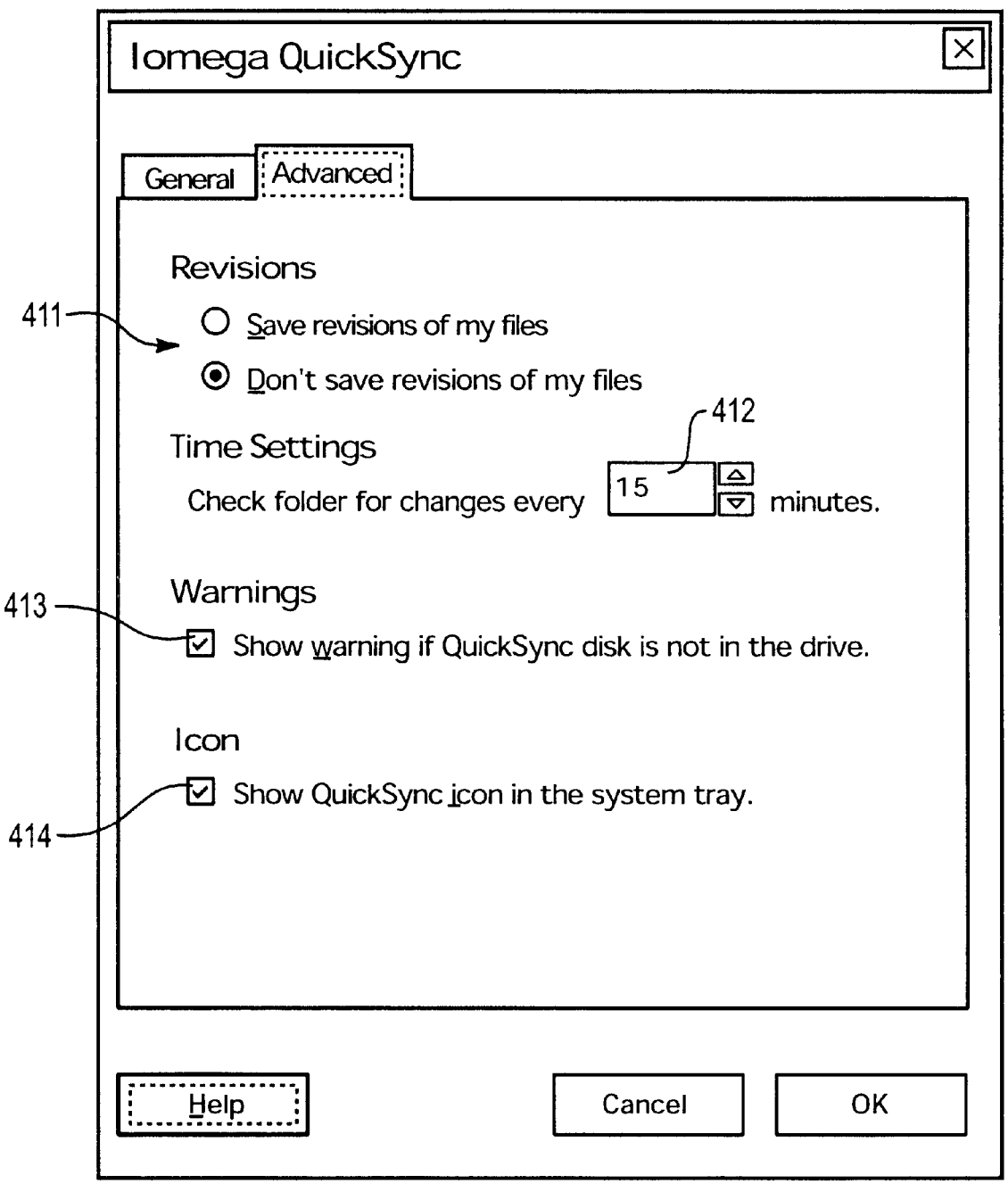

From step (202), i.e., from the display of FIG. 12, the user can access and adjust advanced settings of the mirror application in step (212). This is preferably done by selecting the "Advanced" tab (410) in the display of FIG. 12. FIG. 13 provides an exemplary display of the advanced settings controls for the mirror application of the present invention.

At step (220), the user can turn on or off the mirroring of revisions to the files in the source folder. This is done using the "Revisions" radio buttons (411) in FIG. 13. If the "Revisions" feature of the application is activated, each time a data file is mirrored to the backup data storage location, a new numbered version of the file will be stored at the backup data storage location. If the "Revisions" feature is not activated, the mirror application of the present invention will overwrite the previous corresponding backup file in the backup data storage location each time the source file is mirrored. This will be explained in more detail below.

At step (224), the user can also control the polling time, which is the interval at which the mirror application checks the source folder for changes and mirrors detected changes to the destination location. This is controlled by entering a time interval, preferably in minutes, to the field (412) in the display of FIG. 13. The default setting is preferably five minutes. The default may be accepted or left unaltered by the user at step (226), or another time increment may be specified at step (228). Alternatively or additionally, the "Time Settings" portion of the display in FIG. 13 may include a box that can be checked or unchecked specifying that a check for changes to the source data is performed upon shut down of the system. If this box (not shown) is checked in step (230), the mirror application of the present invention will check for changes to the source data upon shut down of the system and will mirror changes discovered to the designated backup data storage location.

At step (222), the user can control whether the mirror application provides a warning if the designated data backup location is unavailable, for example, the designated mirror disk is not inserted in the appropriate drive. This can be done by checking or unchecking box (413) in FIG. 13.

At step (214), the user can control whether the QuikSync icon is displayed in the system tray of the user interface. This can be done by checking or unchecking box (414) in FIG. 13. The box (414) is checked and the icon is active at step (216). The box (414) is unchecked and the icon is not in the system tray at step (218).

An advantage of the present invention over conventional backup utilities is that a separate restore operation is not necessary to restore the most recent version of a file. In accordance with the present invention, filenames on the mirror disk have a revision number placed after the filename and before the extension. Thus, a source file in the source folder having the name "myfile.doc" will be stored on the mirror disk having the name "myfile(1).doc" for a first revision and so on. The mirror application advantageously keeps an infinite number of revisions. Thus, to restore a file (e.g., "myfile.doc"), the user simply inserts the mirror disk into the removable media drive and selects the highest numerical revision of the file (e.g., "myfile(87).doc"). The file can be simply copied back to the source folder or other folder and/or drive for immediate use.

The mirror application is preferably adapted to prompt the user if certain error conditions arise during its operation. For example, if a single file to be mirrored is larger than the total capacity of the destination media, the user may be shown a dialog box indicating that source file, e.g., "myfile.doc" is larger than the total capacity of the media and cannot be mirrored to the designated backup data storage location. If the current backup data storage location (e.g., a mirror disk) is full, the mirror application will prompt the user to make another mirror disk or work offline (e.g., mirroring data filed to a temporary directory on the hard drive if space allows). Also, if the mirror disk is not in the drive, the user will be given the choice to create a new mirror disk, insert an existing mirror disk, or work offline.

The following are the classes exposed by the present invention to implement the mirroring operation. A Control object acts as a flow controller for the application. All communication between modules is preferably routed through Control. The Control module will start the file monitor and the poll routine. It will also start the copying engine when needed.

Public Members:
Run ( )—creates a thread that launches the file monitor thread, waits for events form the file monitor, polls at a user specified interval, runs engine when changes are detected, passes errors that occur to the error manager, starts and stops the system tray icon animation when copying files.

OnSettingsChange ( )—calls Abort ( ) and then calls Run ( ) so the user changes will be detected Abort ( )—stops the wait for event loops and kills the thread OnShutdown ( )—calls Abort ( ) to stop the event loop and then calls the Poll module to backup any files that might have changed since the last backup; this will be called at system shutdown only Private/Protected Members:
StartFileMon ( )—launches the File Monitor thread SaveDiskID ( )—saves the serial number of the disk to the registry; this will be used to track the current Mirror disk GetDiskID ( )—retrieves the serial number of the current Mirror disk from the registry; ;this will be used to ensure the current Mirror disk is present SaveLastBackupTime ( )—saves the time that Mirror was last run to the registry GetLastBackupTime ( )—retrieves the time from the registry that Mirror was last run StartPoll ( )—launches the Poll module to see what files have changed since the last backup StartEngine ( )—launches the Engine module and makes a call to animate the system tray icon StartAnimateIcon ( )—starts the system tray icon animation StopAnimateIcon ( )—stops the system tray icon animation OnCreate ( )—creates the event loop thread and places an icon on the system tray LockDrive ( )—makes the disk in the specified drive non-removable UnLockDrive ( )—makes the disk in the specified drive removable IsCurrentMirrorMedia ( )—checks to see if the current disk in the drive is the current Mirror disk CreateMirrorMedia ( )—prepares the current disk in the drive for use by Mirror.

The embodiments described above are used to primarily to mirror data files saved in a directory on a fixed or removable media drive to local removable media for archival purposes. The following embodiments are more particularly directed towards mirroring data to a storage device in a different and/or remote location. It will be appreciated by those skilled in the art that many of the principles of operation, features, details and functionality of the foregoing embodiments are applicable to and useful with the following embodiments. Thus, the following description will focus on the differences between the embodiments herein for local media and remote media being used with a different computer.

Generally, the following embodiments are used to synchronize data and/or files as between a 'universe' comprising multiple electronic devices or 'nodes.' Each node is coupled or may be coupled to a communications network such that the nodes can communicate with one another over the network. In addition, each node is provided with an agent that detects changes and then orchestrates transmission of the changes to other nodes in the universe.

Under the principles of the present invention, a "node" may be an electronic device with the capacity to store and use electronic data. For example, a node may be a computer such as a personal computer, a mobile telephone, a LAN, a server, a remote storage device such as a remote server or an Internet-based storage device, a personal data assistant ("PDA"), a smart pager such as a two-way pager, a smart land-line telephone, or the like. The communications network may be the Internet, a public switched telephone network, a mobile-switched network, a combination thereof, or the like. The agent may be a mirror application similar to that described in the embodiments above, though adapted as necessary to run on a particular node. It should be appreciated that additional functionality will be provided in an agent application beyond that described above in connection with the mirror application of the present invention so that the agent application can perform the additional tasks described below.

Figure 14:
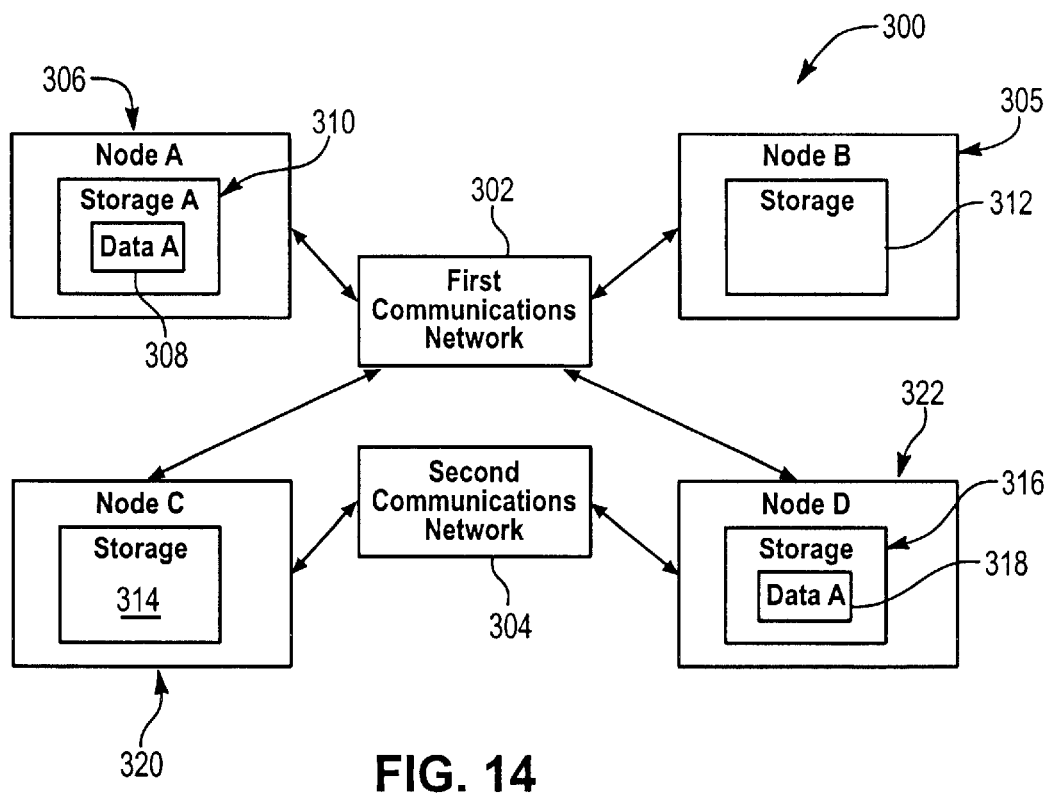
FIGS. 14–17 are block diagrams illustrating an embodiment of the present invention for storing backup data to a destination node across a communications network.

FIG. 14 illustrates an embodiment (300) of the present invention that includes two communications networks (302, 304) and four nodes (305, 306, 320 and 322). As shown, each node includes a data storage device (e.g., semiconductor memory, hard drive, removable data storage, etc.) Node A (306) includes data set A (308) being stored in its storage device (310). Under the principles of the present invention, data set A (308) may be backed up to the node B storage device (312), the node C storage device (314) and/or the node D storage device (316). Similarly, node D (322) includes data set D (318) that may be backed up using the communications networks (302, 304) to Nodes A (306), B (305) and C (320).

As illustrated in FIG. 14, node C (320) and node D (322) may be in electronic communication with both communications networks (304, 302). An example of a device that may connect directly to two separate networks is a web phone. When used as a telephone, the web phone connects to the public switched telecommunications network, where a user's voice is transmitted across the network. When used as a scaled-down web browser, the web phone connects to an internet service provider (ISP) that connects the web phone to the Internet. It will be appreciated by those skilled in the art, that the lines between different communications networks may be blurred as these networks begin to use the same communications equipment and channels to transmit and receive data.

Figure 15:
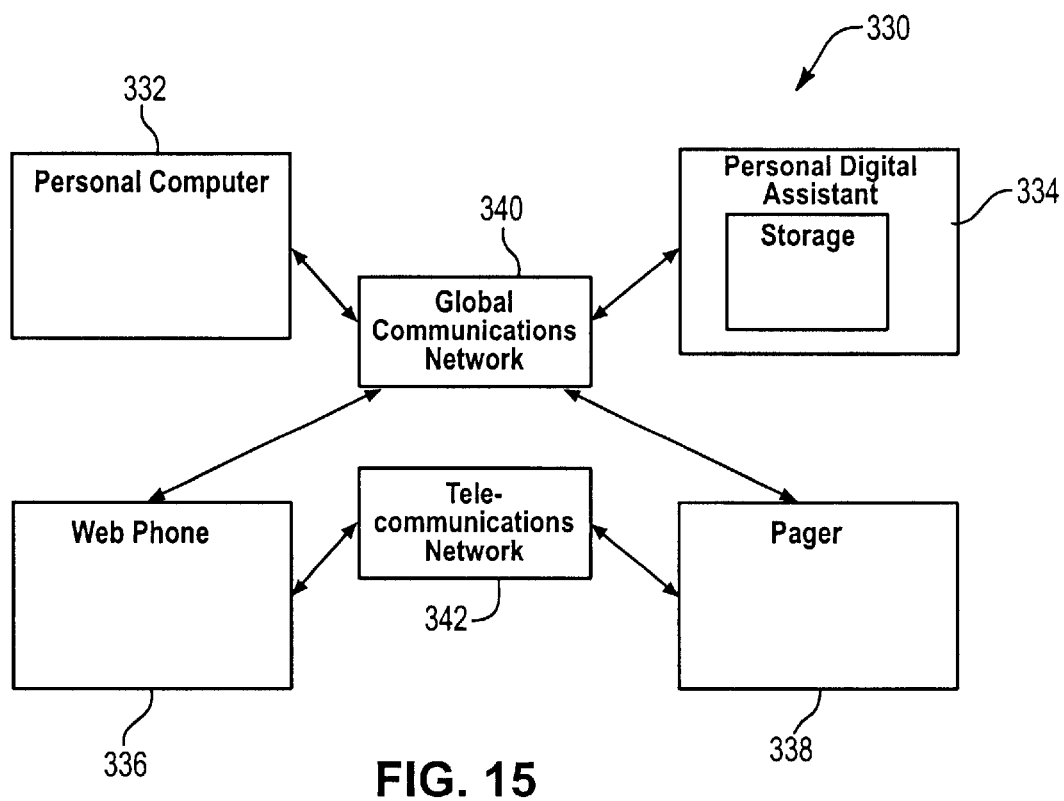

FIG. 15 illustrates a more particular embodiment (330) of the present invention that may be used to mirror data to another electronic device (that includes storage) in a different and/or remote location across a communications network or networks. The exemplary nodes of FIG. 15 are illustrated as a personal computer (332), a personal digital assistant ("PDA") (334), a web phone (336) and a two-way pager (338). As illustrated, the personal computer (332), the PDA (334) and the web-phone (336) may all be in electronic communication with a global communications network (340). In one preferred embodiment, the global communications network (340) is the Internet. The web-phone (336) and the pager (338) may be in electronic communication wirelessly with a distinct telecommunications network (342) for use with cellular telephones and/or pagers. The communications channels as shown, via the communications networks (342, 340), may be used to send and receive data to accomplish the mirroring of data according to the principles of the present invention.

Figure 16:
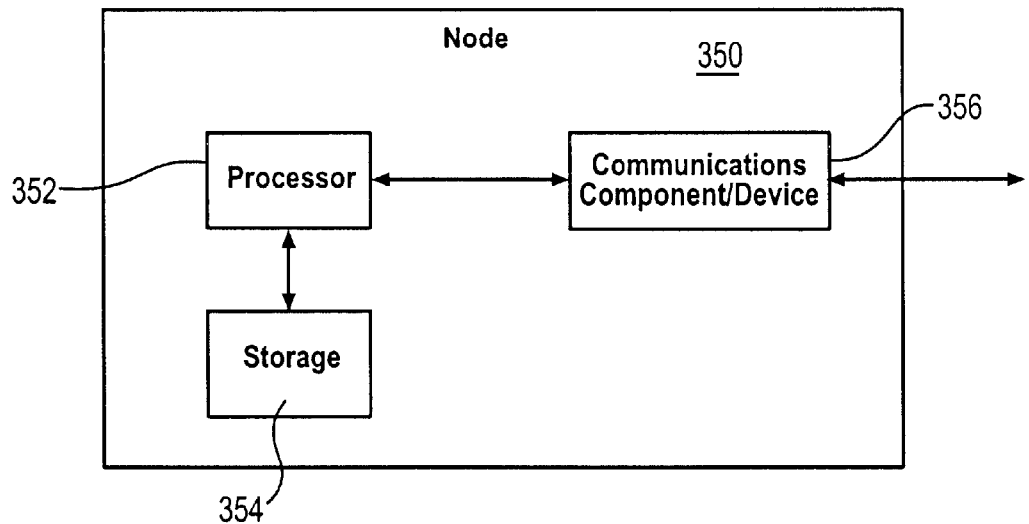

As described, the nodes (332, 334, 336 and 338) may comprise various types of electronic devices. FIG. 1 illustrates an embodiment of a personal computer with particularity. Those skilled in the art will appreciate the various components that may be found in the various electronic devices that can be used as a "node" of the present invention. FIG. 16 illustrates very generally the basic components found in a generic node (350). As shown in FIG. 16, each node (350) preferably includes a processor (352) for processing electronic data, a data storage device (354) for storing electronic data and a communications component or device (356) for communicating electronic data over a communications network.

The storage device (354) may be any type of storage component for storing electronic data, including, but not limited to, semiconductor memory, a hard drive, a removable data storage medium and corresponding drive, etc. The storage device (354) simply needs to the ability to store electronic data and allow that data to be retrieved upon command.

The communications component (356) may be any electronic component or device that facilitates data communication, wirelessly or otherwise, with other nodes. For example, in a personal computer, the communications component (356) may be a modem, a network card, a serial port, etc. With a PDA, the communications component (356) may be a wireless modem, infrared or radio frequency. The communications component (356) of a web phone may be its transceiver In the various embodiments of the present invention, a mirroring agent application running at each node periodically checks predetermined files and/or data to determine whether such files/data have changed. Upon the agent at the node finding that a file/data has changed, the agent commences to check with agents at other pre-determined nodes to see whether the file/data needs to be updated at the other nodes. As described above in connection with FIGS. 12 and 13, the interval between checks for altered files/data, and the particular files/data that are monitored for changes may be controlled and designated by the user of the node, by an administrator of the node, by the administrator of a network including the node, etc.

If, for example, a universe consists of four nodes, A, B, C and D (305, 306, 320 and 322), as shown in FIG. 14, and the agent at the A node (306) finds that designated files / data stored in storage (310) have been updated or changed, the A agent may:

1. communicate with the B agent to determine if the B node (305) contains a version of the data different from that stored on the A node (306);
2. if so, determine along with the B agent which version is more current; and
3. assuming the A version is more current, send the A version to B, upon which B appropriately updates the B version of the file/data in storage (312) with the data received from node A (306).

The A agent may then repeat the process with regard to the C agent and the C node (320) and the D agent and the D node (322).

The B agent may then note that such file/data has changed, i.e., has been overwritten with the data from node A (306), and attempt to mirror the change to the C node (320), the D node (322) and the A node (306). Of course, in this example, the changed file/data originated from the A node (306) and therefore need not be changed at the A node (306), which the A agent will confirm with the B agent. Likewise, assuming the A agent already propagated the changed file/data to the C node (320) and the D node (322), the file/data need not be changed at the C node (320) or the D node (322), which the C and D agents will confirm with the B agent.

It may be the case that the B agent notes that the changed file/data originated with or came from the A node (306) and therefore does not again poll the A agent. Similarly, it may be the case that the A agent notes to the B agent that the A agent will propagate the change to the C and D nodes (320, 322) so that the B agent should not contact the C or D agents. However, it may also be the case that such communication does not occur between the nodes to ensure that redundant checks do in fact occur. As may be appreciated, such redundancy ensures that the data is in fact propagated to all appropriate nodes. However, depending on the number of nodes in the system, too much redundancy can choke the communications network if too many node agents are seeking to communicating with each other.

A separate issue arises in the case where, for example, the A agent cannot communicate with the B agent because the B agent is offline or otherwise out of communication with the network (302). In such case, the A agent preferably notes that it must contact the B agent in an item on a to-do list, and periodically reviews the to-do list to attempt to perform each item thereon. Of course, once the item is performed, the contact with B is established, and any file/data propagation with B takes place, the item may be removed from the list.

In setting up the agent at each node, different files/data or different types of data may be designated for different handling by the mirroring agent. That is, for example, word processor files on a PC are mirrored only to other PCs and to servers, while telephone number data may be mirrored to other PCs and to mobile phones. Preferably, the user will be able to designate which files and/or types of monitored data are mirrored to which nodes in the system.

To further customize the system, particular nodes in a universe may be programmed by the user to communicate with agents at only a sub-set of the other nodes in the universe. For example, in the above example, node A (306) may be programmed to communicate changed filed/data with only node B (305). Similarly, node B (305) may be programmed to communicate changed filed/data with only node C (320); node C (320) may be programmed to communicate changed filed/data with only node D (322); and node D (322) may be programmed to communicate changed filed/data with only node A (306). Note here that changed files/data are propagated 'around the circle' to all nodes unless one node is out of communications with the others.

Propagating a file is relatively simple in that the entire file is sent off. Propagating data can be more complex, especially if the data must be extracted from a file, table, data structure, or the like. In such a case, each agent preferably includes or has access to an appropriate extracting tool (or data accessor). The agent then extracts designated data into an appropriate format, and sends that data to other node(s) on the system when changes are made or detected, or a mirroring operation is otherwise initiated. The data as received at the receiving agent is then injected back into the appropriate file, table, data structure, or the like in the appropriate format. Of course, the extracting tool and/or injecting tool may operate in conjunction with and/or be a part of a program or executable file that normally handles such data, and such program or executable file may work with the sending agent to notify the agent when a change in such data takes place.

Figure 17:
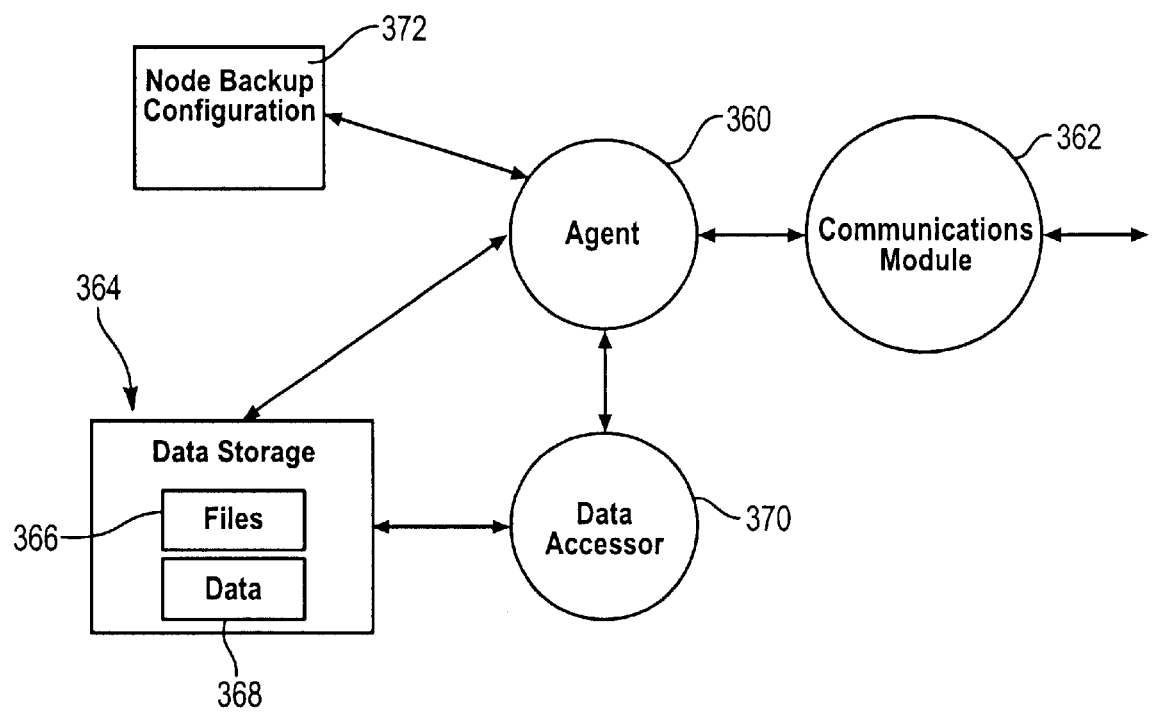

FIG. 17 illustrates generally the software and data components in each node used in mirroring the data across a communications network. The agent (360) sends and receives communications using a communications module (362), such as, for example, communications software, drivers, etc. A storage device (364) at the node stores files (366) and/or data (368). In certain embodiments the agent (360) may directly access the data (368) on the storage device (364). In other embodiments, a data accessor (370) component may be needed to access the data (368). For example, if the data (368) is being read from or written to a database, a database accessor (370) (e.g., a database front end) may be used to read and/or write to the database. A node backup configuration file (372) may include information that determines how the node will operate in its operations.

Table 1 illustrates a node backup configuration file (372), in pseudocode form. As shown, the configuration data (372) may include the name or identification of a destination device to which particular data/files/updates are sent. In addition, the node backup configuration file (372) may indicate another node that is programmed to backup data to this particular node. The communication address/location of the node comprises an address or location of the other node. For example, the communications address may be an IP address, a domain name, a telephone number, a machine name, routing instructions, etc. The node backup configuration file (372) may also indicate the particular data/files to be backed up to the remote node. Alternatively, if data is being sent from another node to be stored at this node, the Data Backup may indicate the particular files, directories, folders, drives, etc., where the incoming data is to be stored. The configuration file (372) may also include Configuration Information for Node which provides various pieces of configuration information for the backup or mirroring operation. For example, authentication information, data format, conversion information, timing data, etc., may all be included in the configuration data. In addition, other data may be stored in the configuration data.

TABLE 1

1 Node Backup
1 Communications Address/Location of Node
1 Data Backup
1 Configuration Information for Node
2 Node Backup
. . .

It will be appreciated by those skilled in the art that the exemplary computer system of FIG. 1 may be used with the embodiments for the mirroring of data between nodes, with the addition of the communications components and modules, as discussed above. Any of the storage components of FIG. 1, including the memory (14), the hard disk drive (26), the floppy disk drive (28), the tape drive (15), the CD-ROM/R/RW drive (17), and the high capacity removable media drive (1a) may be used to store a file/data that is being mirrored between nodes. The data being mirrored to another node does not need to be stored on a removable media drive.

The installation process for the embodiments mirroring data between nodes is substantially similar to the installation process as already disclosed, except that facilities for allowing a user to input/select node names, addresses, drives, and the like, is added. In addition, present embodiments for mirroring data between nodes check the communications between the present node and user-entered nodes to ensure that communications can be established. The user interface screens shown above may similarly be modified to allow the additional capabilities and features, as discussed above.

With the present invention, and as an example, a company or other entity that provides a mobile phone to each of several employees may ensure that telephone directory changes made on one mobile phone are propagated to all other mobile phones. Thus, phone numbers such as client phone numbers on one mobile phone are available to all employees at other mobile phones, and perhaps more importantly changes to such phone numbers on one mobile phone are also available to all employees at other mobile phones. Also with the present invention, and as another example, new photograph files in a 'Pictures of My Kids' directory of a PC may automatically be propagated to the PC of a grandparent.

The programming necessary to effectuate the processes performed in connection with the present invention is relatively straightforward and should be apparent to those skilled in the art based on the information provided in this text. Accordingly, specific programming is not attached hereto. Any particular programming, then, may be employed to effectuate the present embodiments without departing from the spirit and scope thereof.

Figure 18:
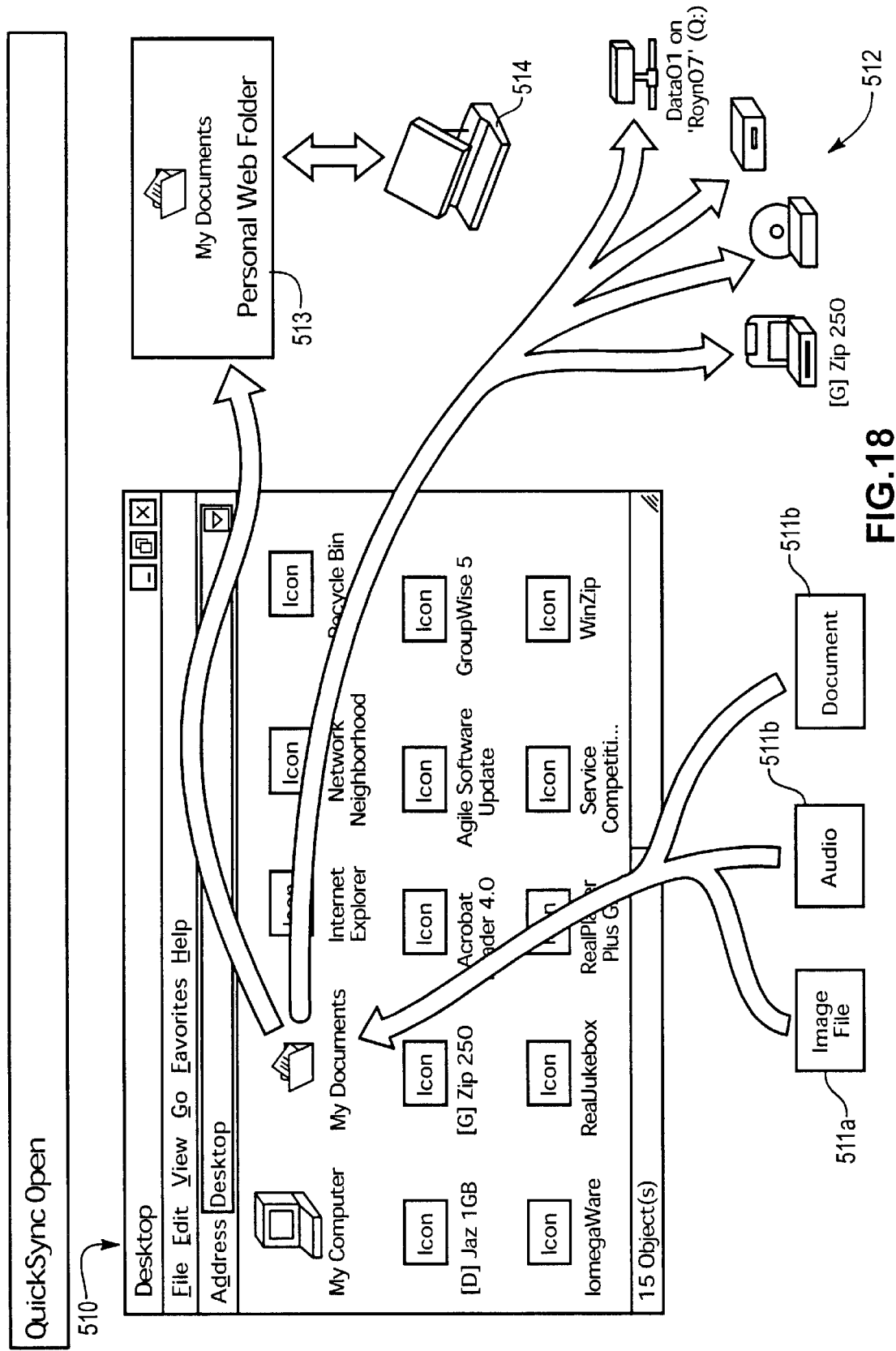
FIG. 18 is a block diagram illustrating some of the principles of the present invention.

<new material> FIG. 18 provides another high-level illustration of the present invention. As shown in FIG. 18, a user's computer, illustrated by the desktop display (510) of the user interface, contains electronic data files (511) of the user. These files may be of any type, for example, image files (511a), audio files (511b) and document or word processing files (511c).

Under the principles of the present invention, when a data file (511) is created, it is automatically backed up to one or more backup data storage locations. Additionally, when any changes or alterations are made to any of the data files (511), those changes are also automatically mirrored to the backup copies of the files at the backup data storage locations.

The backup storage locations can include, as described above, removable data storage media (512) such as floppy disks, Zip® and other high-density magnetic data storage media, and optical storage media such a writable and rewritable compact discs. The backup storage location may also preferably include an Internet or World-Wide-Web based storage location (513). This may be a server accessed via the Internet where data storage space is allocated to the user, i.e. a "Personal Web Folder" (513). The files stored on the Web Folder (513) may be accessed with a personal computer connected to the Internet or a web appliance (514).

Figure 19:
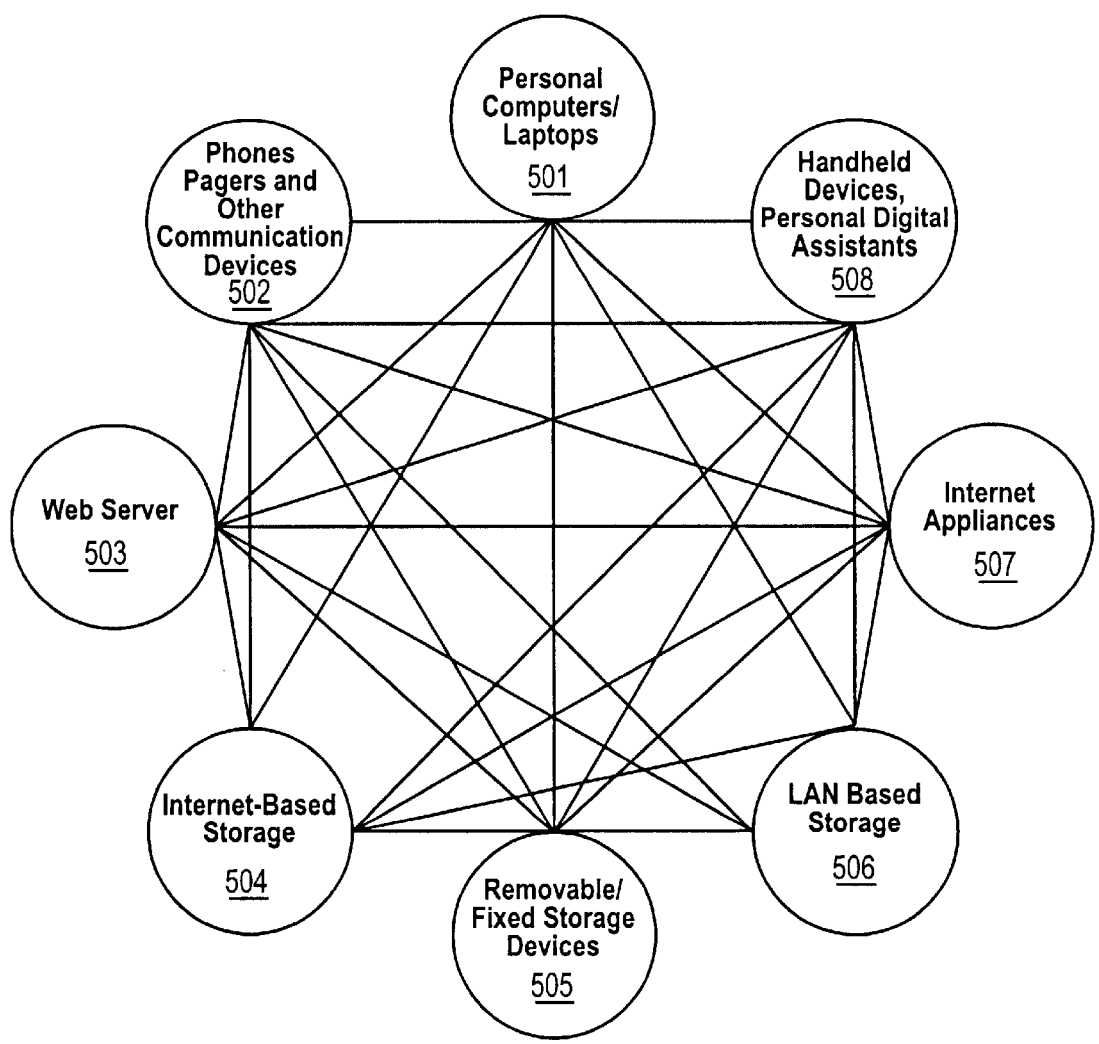
FIG. 19 is a diagram of the data mirroring system of the present invention.

FIG. 19 illustrates further the bi-directional nature of the data mirroring system of the present invention. As shown in FIG. 19, the user may have data and data files stored on a wide variety of electronic devices. Obviously, personal computers or a laptop (501) may store any type of data file. Phones, pagers an other communications devices (502) may store, as described above, telephone numbers and related information. Data files may also be stored or created on a web server (503) or an Internet based storage location (504). As described above, data may also be stored on removable and/or fixed data storage devices (505) such as hard drives, floppy disks, high density media, CD's, etc. Data files may also be stored on a machine or data storage device connected to and accessed through a Local Area Network (LAN) (506). Data may also be stored or created on an internet appliance (507). An internet appliance is a scaled down computer which is, usually, in constant communication with the Internet and is user primarily for surfing the World Wide Web or sending and receiving e-mail. Finally, data files may be stored on a handheld device or personal digital assistant (PDA) (508).

As shown in FIG. 19, each of these types of devices may be in communication with any of the other types of devices. This communication, represented by the bi-directional lines interconnecting each and every type of device in FIG. 19, allows the sharing of data from any type of device with any other type of device illustrated in FIG. 19. For example, computers (501) can communicate with internet sites (504), web servers (503) and internet appliances (507) via the Internet. Communication from a wireless or smart phone, or a pager or other communications device (502) may be through the wireless infrastructure or wired telephone network serving that device. PDAs (508) may communicate wirelessly with a wireless infrastructure and, so communicate data to and from other devices. PDAs (508) may also be wired to computers, etc., for the transfer of data. In short, any of the devices illustrated in FIG. 19 can be brought into communication with any other device illustrated in FIG. 19.

Under the principles of the present invention, when a data file stored on any of the devices illustrated in FIG. 19 is created or updated, the new data is transmitted automatically to any of the other devices which are maintaining a copy of that data file or that type of data file. For example, and as described above, changes to telephone number and related information made on a computer (501) may be transmitted to a phone, page or communications device (502), and vice versa. Similarly, an electronic document created or updated on a computer (501) may be mirrored to a web server (503), an Internet-based storage location (504), a removable data storage medium (505), a LAN-base storage location (506) and a PDA (508).

Many similar scenarios are readily apparent from the illustration of FIG. 19. The important aspect of the present invention is that data from any type of data-storing device can be mirrored to and backed up on any other type of device, as appropriate.

An important feature of the present invention is the ability to mirror or synchronize data files with a backup data storage location on the World Wide Web or Internet. The remaining Figures illustrate exemplary display screens for installing and operating a data mirroring application under the principles of the present invention that mirrors data to an Internet data storage location.

Figure 20:
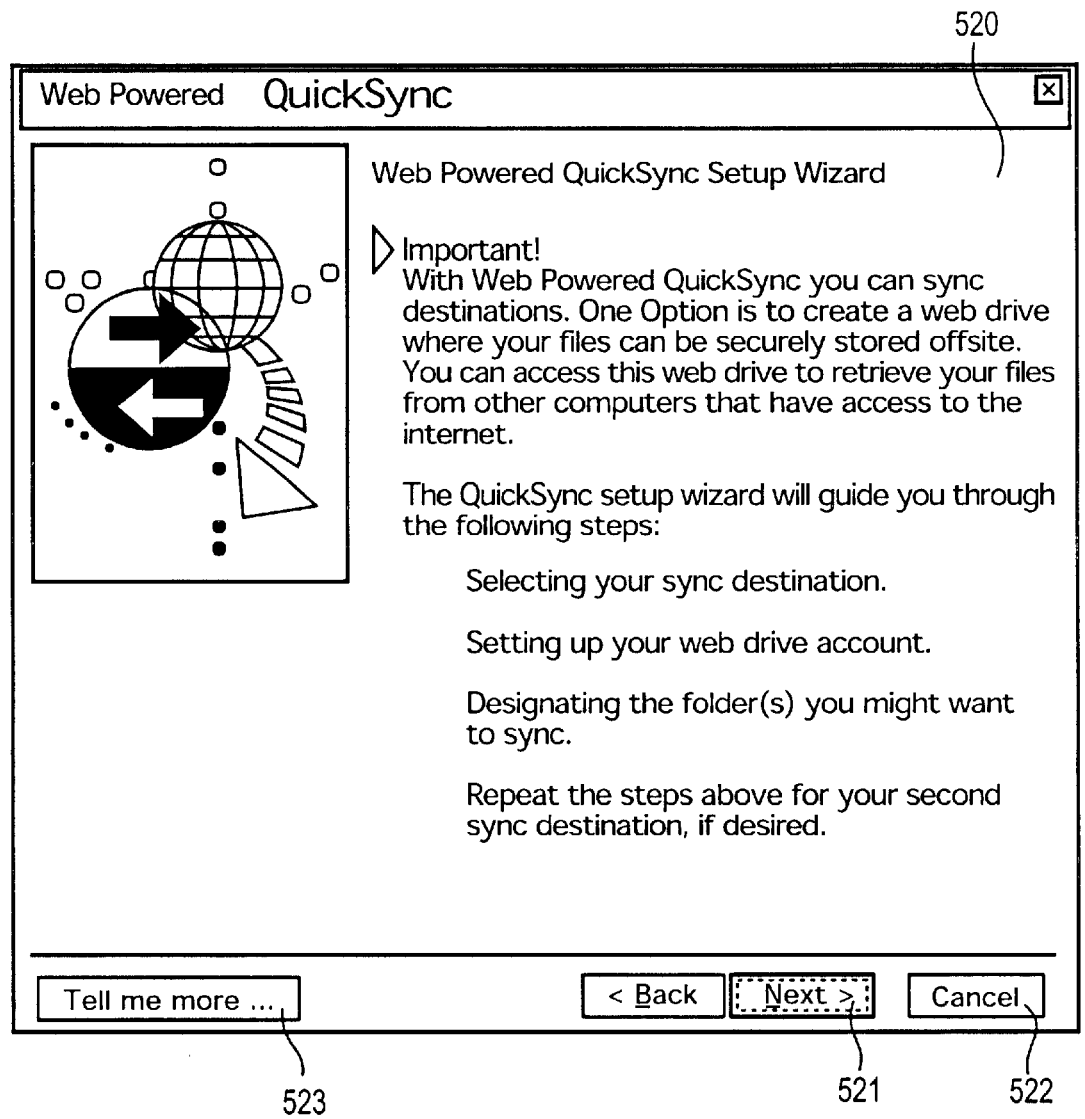

FIG. 20 illustrates an exemplary initial screen (520) for a Setup Wizard for a data mirroring application under the principles of the present invention that mirrors data to an Internet data storage location. The main text of the display may read as follows: "Important! With Web Powered Quik Sync you can select two sync destinations. One option is to create a web drive where your files can be securely stored off site. You can access the web drive to retrieve your files from other computers that have access to the Internet. The Quik Sync setup wizard will guide you through the following steps: Selecting your sync destination. Setting up your web drive account. Designating the folder(s) you want to sync. Repeat the steps above for your second sync destination, if desired." To proceed the, user selects a "Next" button (521). Alternatively, to exit the wizard, the user may select a "Cancel" button (522). To access help and additional support features, the user may select a "Tell me more . . . " button (523).

Figure 21:
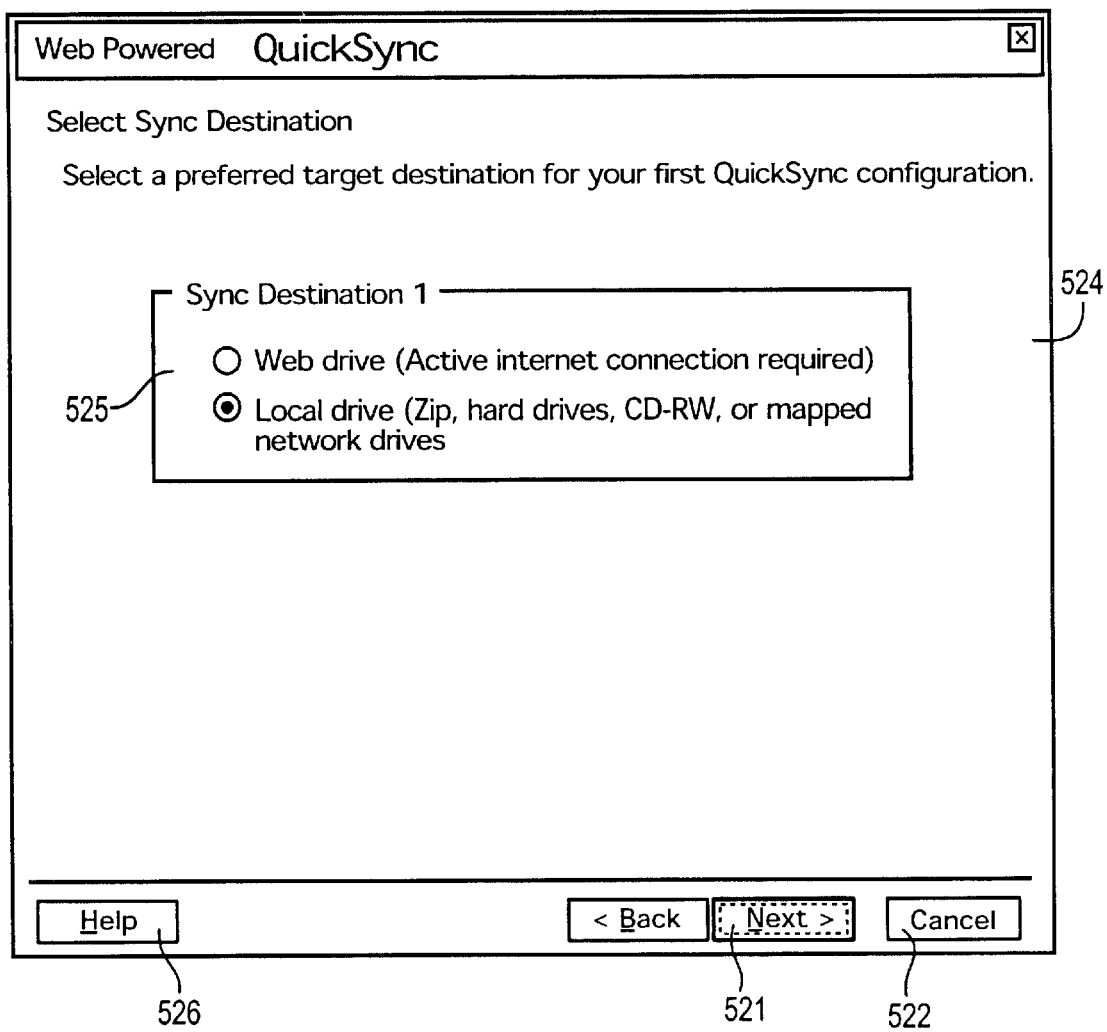

FIG. 21 illustrates a next exemplary screen (524) of the setup wizard. With the screen of FIG. 21, the user can "Select a preferred target destination for your first Quik Sync configuration." The display (524) preferably includes a radio button set (525) with a number of backup data locations or "Sync Destinations" from which the user can select. Preferably, as shown in FIG. 21, this radio button set includes (1) "Web drive (Active Internet connection required)," and (2) "Local drive (Zip, hard drives, CD-RW or mapped network drives)." The help features may be accessed with a "Help" button (526). As used herein, the term "local backup storage location" will be used to describe backup storage locations, which are connected to a host computer and are not accessed by the host computer via the Internet. Consequently, "local backup storage locations" include, but are not limited to, floppy disk drives, hard drives, networked servers, Iomega® Zip®, Iomega® Jaz®, Iomega® Clik!™, CD-RW drives, etc.

FIG. 22 illustrates an exemplary screen (530) of the setup wizard for creating a web drive, i.e., a personal, secure data backup location on a web-based data storage site. The screen (530) preferably solicits user information including a "Customer Profile" and "Account Security" information. The Customer Profile is preferably a number of fields which the user fills in, including, for example, first and last name, address (including city, state, postal code and country), e-mail address and modem speed. For fields with a limited number of possible responses, such as state, country and modem speed, a pull-down menu may be provided with the appropriate field listing the range of possible answers from which the user can then select. The Account Security portion of the screen (520) is preferably a second set of fields which the user fills in, including, for example, a user or on-line name, a password, confirmation of the password and, optionally, a password hint that can be fed back to the user if the user has forgotten the password and needs to be reminded of it. When completed, the form can be submitted with a "Submit" button (533) or, if errors have occurred, can be rest with a "Reset" button (534).

Figure 23:
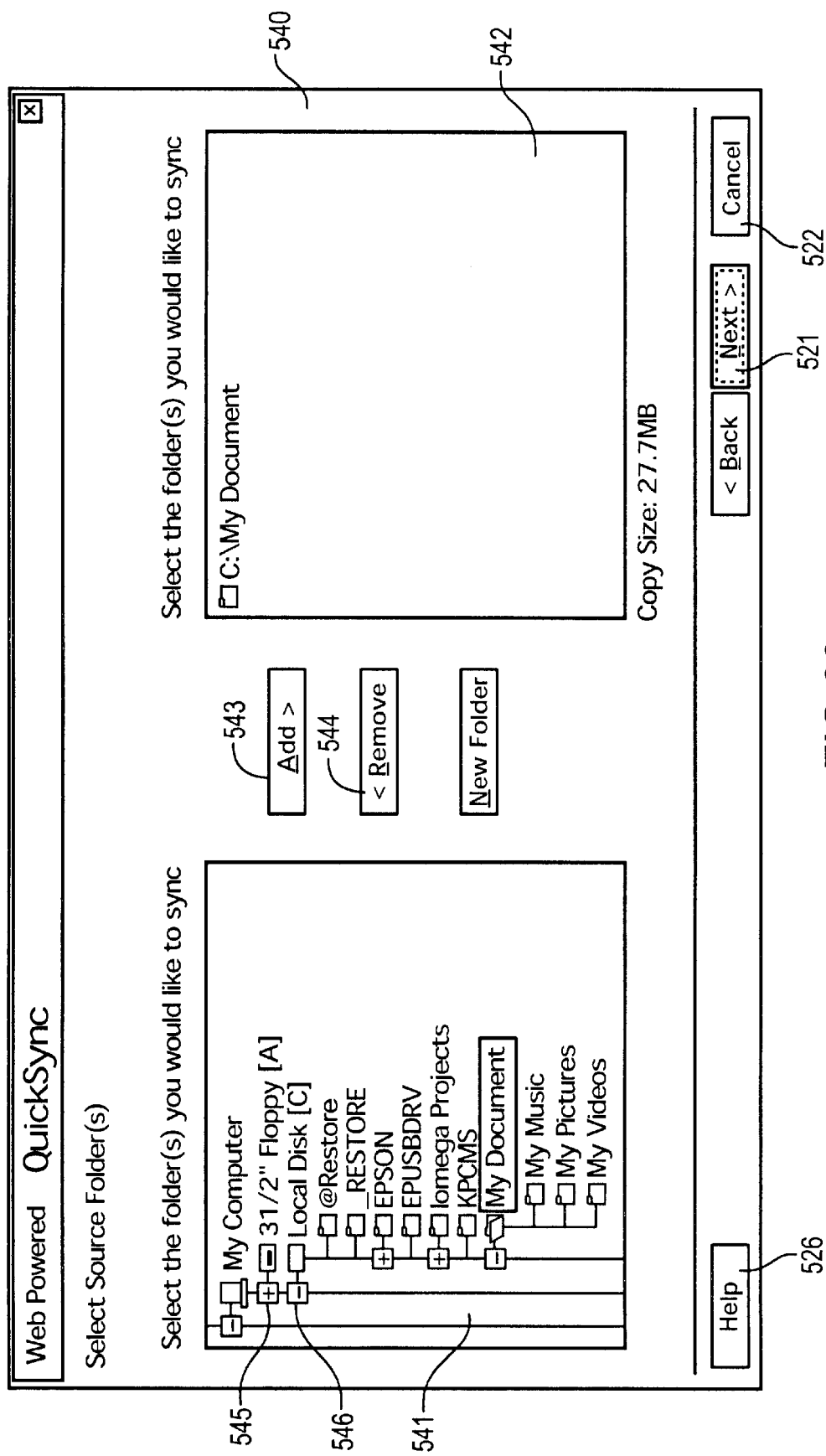

FIG. 23 illustrates an exemplary screen (540) with which the user can select the source folder or folders from which data is to be taken for backup to the backup data location specified with screen (524). As shown in FIG. 23, the screen (540) preferably includes an expandable tree listing (541) of the drives and data files accessible to the computer on which the user is working. Each drive or folder in the listing, which includes folders or sub-folders, will have a "plus" sign (545) or "minus" sign (546) with the listing. Selecting a plus sign (545) causes the tree (541) to expand to include an indented list of all the folders or sub-folders within that listing. Selecting a minus sign (546) causes the tree to collapse, hiding the indenting list of folders or sub-folders within that listing.

From the tree (541), the user can selecting folders or files which he or she wants the mirroring application to automatically synchronize or backup to the specified backup data storage location. To do this, the user highlights a file or folder from the tree (541) and selects an "Add" button (543). The "added" file or folder is then added to a list (542) that is also part of the screen (540). This list (542) may be captioned "These are the folders you have selected to sync:". If a file or folder is added to the list (542) in error, the user can highlight that entry in the list (542) and select a "Remove" button (544). The highlighted file or folder is then removed from the listing (542).

Figure 24:
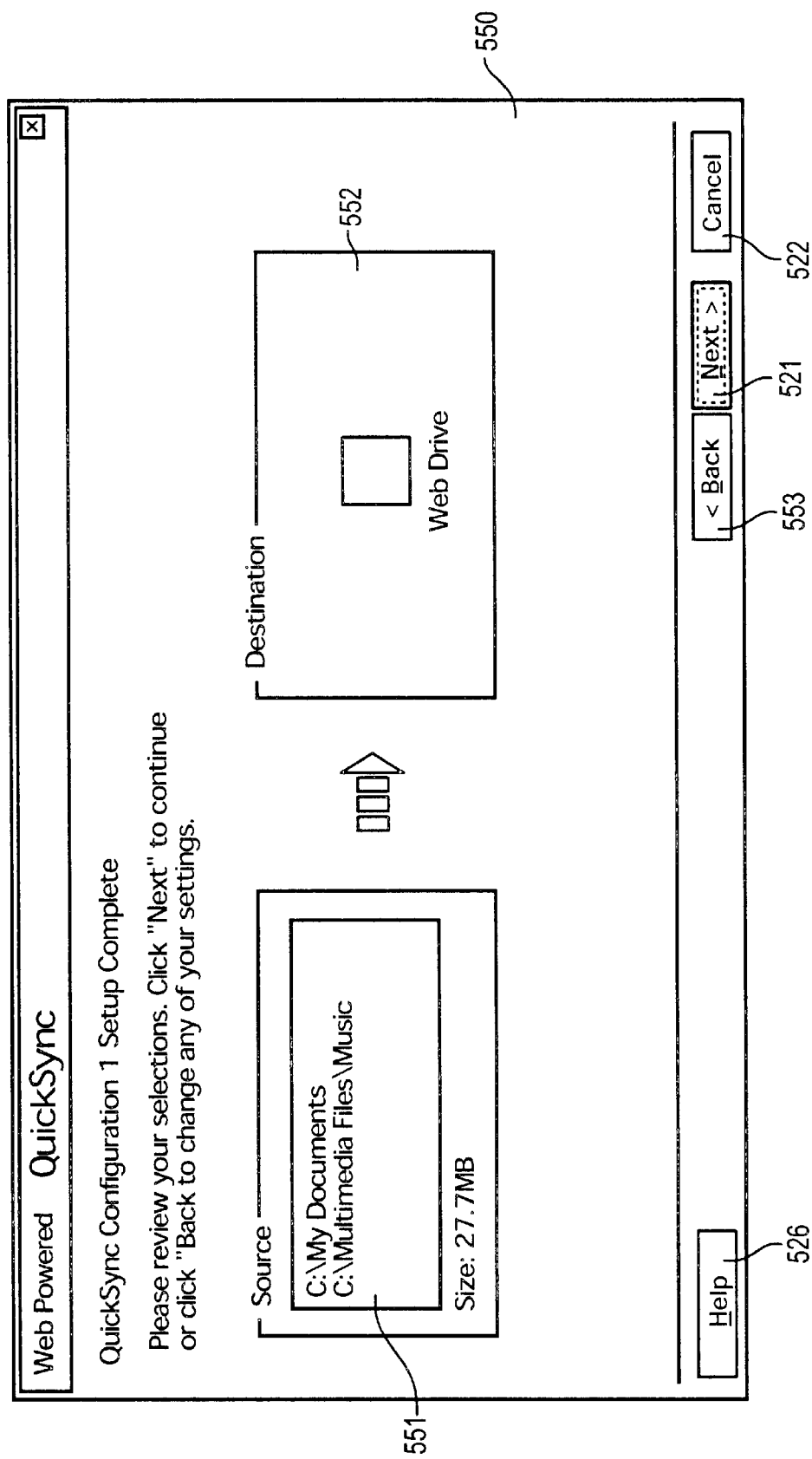

FIG. 24 illustrates the next exemplary screen in the setup wizard. As shown in FIG. 24, the next screen (550) serves to confirm the source and destination data input by the user. A listing (551), preferably on the left, lists the files and/or folders the user has selected as the source data. These files and folders will be mirrored to the backup data location and will, thereafter, be monitored for changes, with changed or updated files being automatically mirrored to the destination or backup data storage location, e.g. a web drive. The screen (550) also provides a listing or icon (552) showing the selected backup data storage location to which the source data will be mirrored.

If any of the source or destination data displayed on the screen (552) is incorrect or not what the user intended, the user can select a "Back" button (553) and move back through the previous screens of the wizard to correct the problem. If the data display on screen (552) is correct, the user continues through the wizard by selecting the "Next" button (521).

Figure 25:
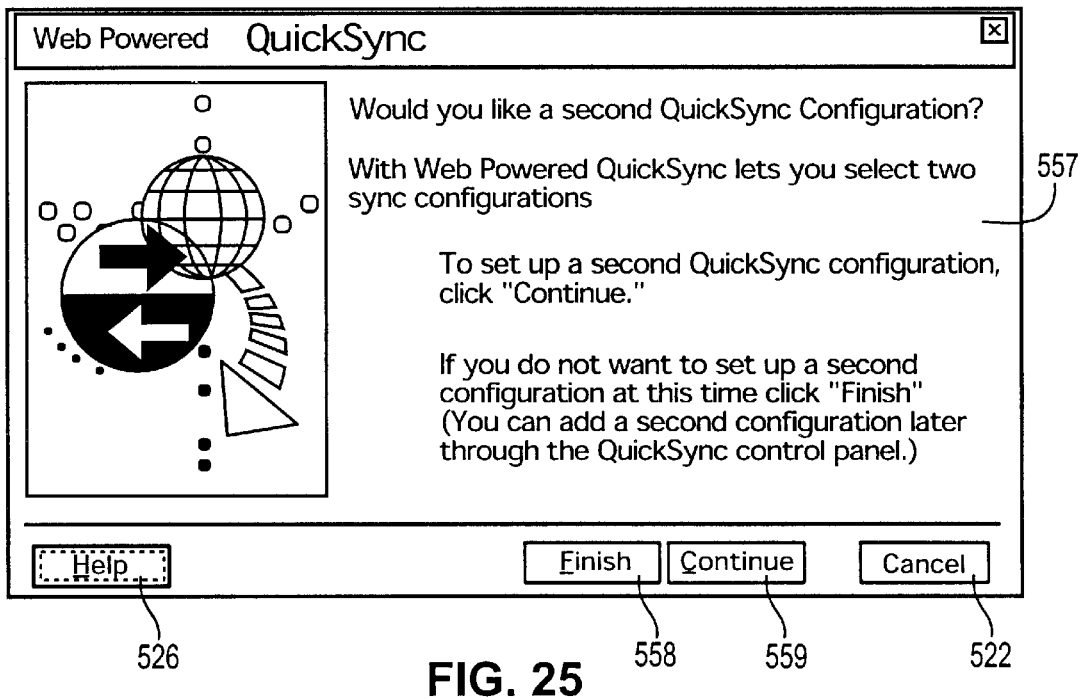

FIG. 25 illustrates a next exemplary screen (557) in the setup wizard. As shown in FIG. 25, screen (557) provides the user with the opportunity to set up a second additional backup data storage location. The principal text may preferably read "To set up a second QuikSync configuration, click 'Continue.' If you do not want to set up a second configuration at this time click 'Finish.' (You can add a second configuration later through the QuikSync control panel)." If the user wishes to only have the designated source data mirrored to one location, the user can then select the "Finish" button (558). If the user selects the "Finish" button (558) the wizard will preferably display the screen illustrated in FIG. 27, after the mirroring application makes an initial copy of all the specified source data (i.e., the files and folders added to the list (542) in FIG. 23) to the selected backup data location (as selected using the screen of FIG. 21). If the user does want to set up a second backup data storage location, the user can select the "Continue" button (559).

Figure 26:
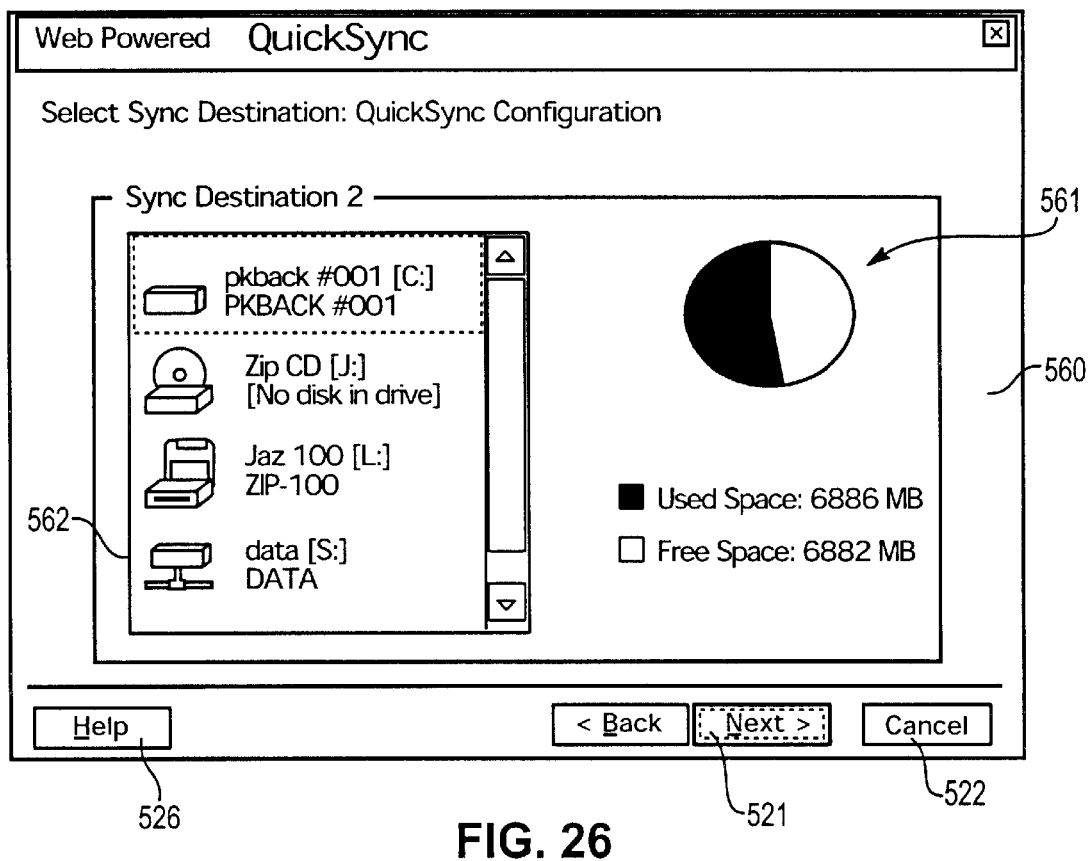

Assuming the user selected the "Continue" button (559), FIG. 26 illustrates a next exemplary screen (561) of the setup wizard. Screen (561) allows the user to specify a second backup data storage location. A listing (562), preferably on the left, lists available backup data storage locations from which the user can choose. A preferred setup wizard assumes that the first backup data storage location will be a web drive as selected and setup using the screens in FIGS. 21 to 24. This exemplary wizard further assumes that the second backup data storage location will be a hard drive or removable data storage media in an appropriate drive accessible to the computer on which the setup wizard is being run.

Consequently, as shown in FIG. 26, the screen (560) preferably includes a listing (562) (preferably with icons) of the disks and disk drives available as a backup data storage location, for example, an RW-CD drive, a Zip® drive, a hard drive or a drive on a networked server. Another portion of the screen (560) may include a graph (561) indicating the amount of used and free space on any drive or disk that is highlighted from the list (562). When the user has highlighted the destination in the list (562) that is to be the secondary backup data storage location, the user selects the "Next" button (521) to execute the selection and proceed with the setup wizard.

Figure 27:
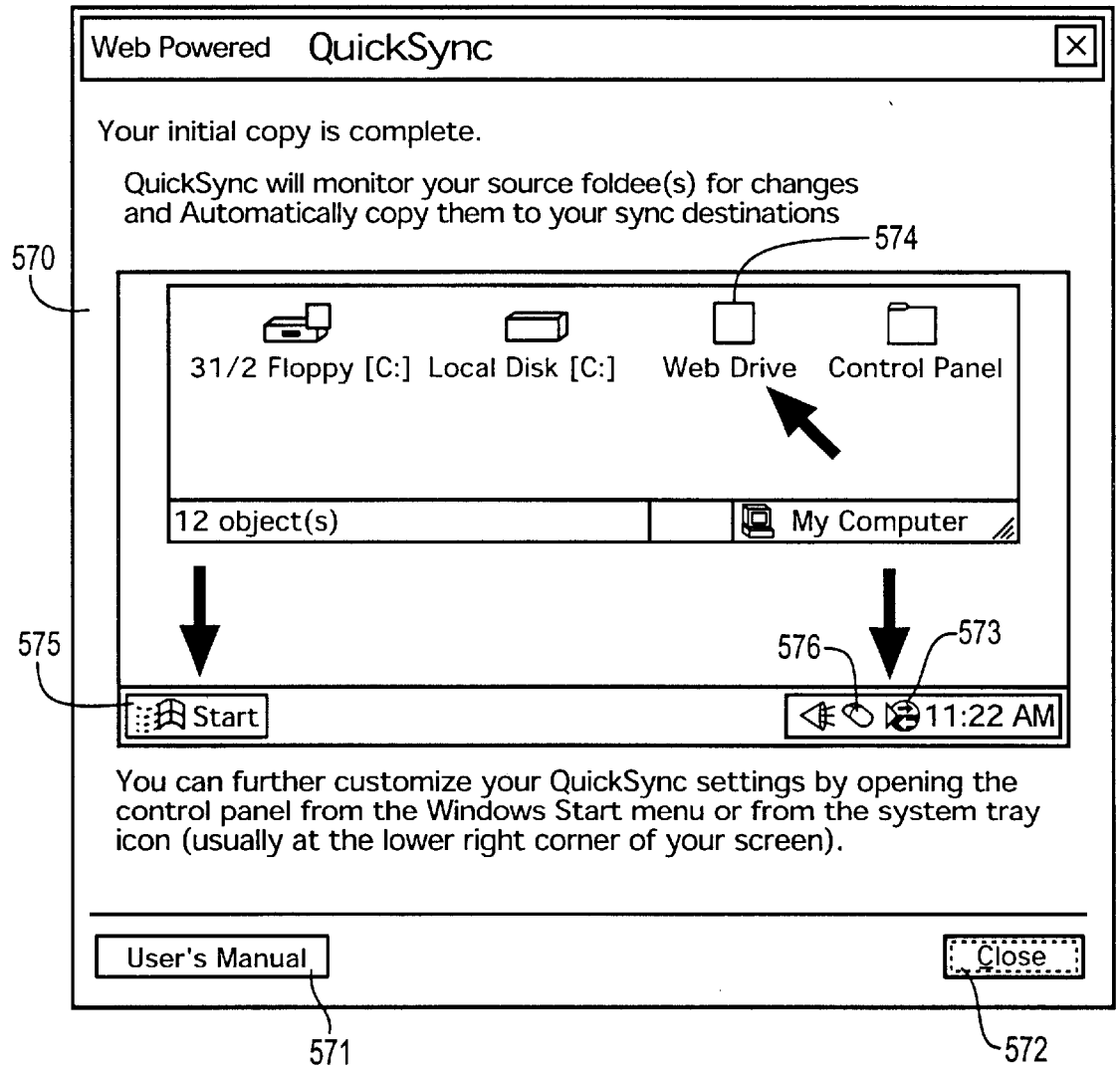

FIG. 27 illustrates the final exemplary screen (570) in the setup wizard. Before the screen (570) of FIG. 27 is shown, the mirroring application will make an initial copy of all the specified source data (i.e., the files and folders added to the list (542) in FIG. 23) to the selected backup data location(s) (as selected using the screens of FIGS. 21 and FIG. 26).

As shown in FIG. 27, the user is advised that "QuikSync will monitor your source folder(s) for changes and automatically copy them to your sync destinations." "You can further customize or change your QuikSync Settings by opening the control panel from the Windows Start menu or from the system tray icon (usually at the lower right corner of your screen)." The screen (570) will also preferably include an illustration indicating the "Windows Start menu" (575) and the mirroring application icon (573) in the system icon tray (576) to assist the user in identifying the elements of the user interface mentioned in the text of the screen (570). If a web drive was created by the wizard, an icon for the web drive (574) may also be part of the screen (570) to illustrate to the user how to access the backup data storage location.

If the user requires additional information, a "User's Manual" button (571) can be selected to access an on-line user's manual. If the user is satisfied with the setup of the mirroring application (i.e., QuikSync), the user can select a "Close" button (572) to exit from the wizard.

Figure 28:
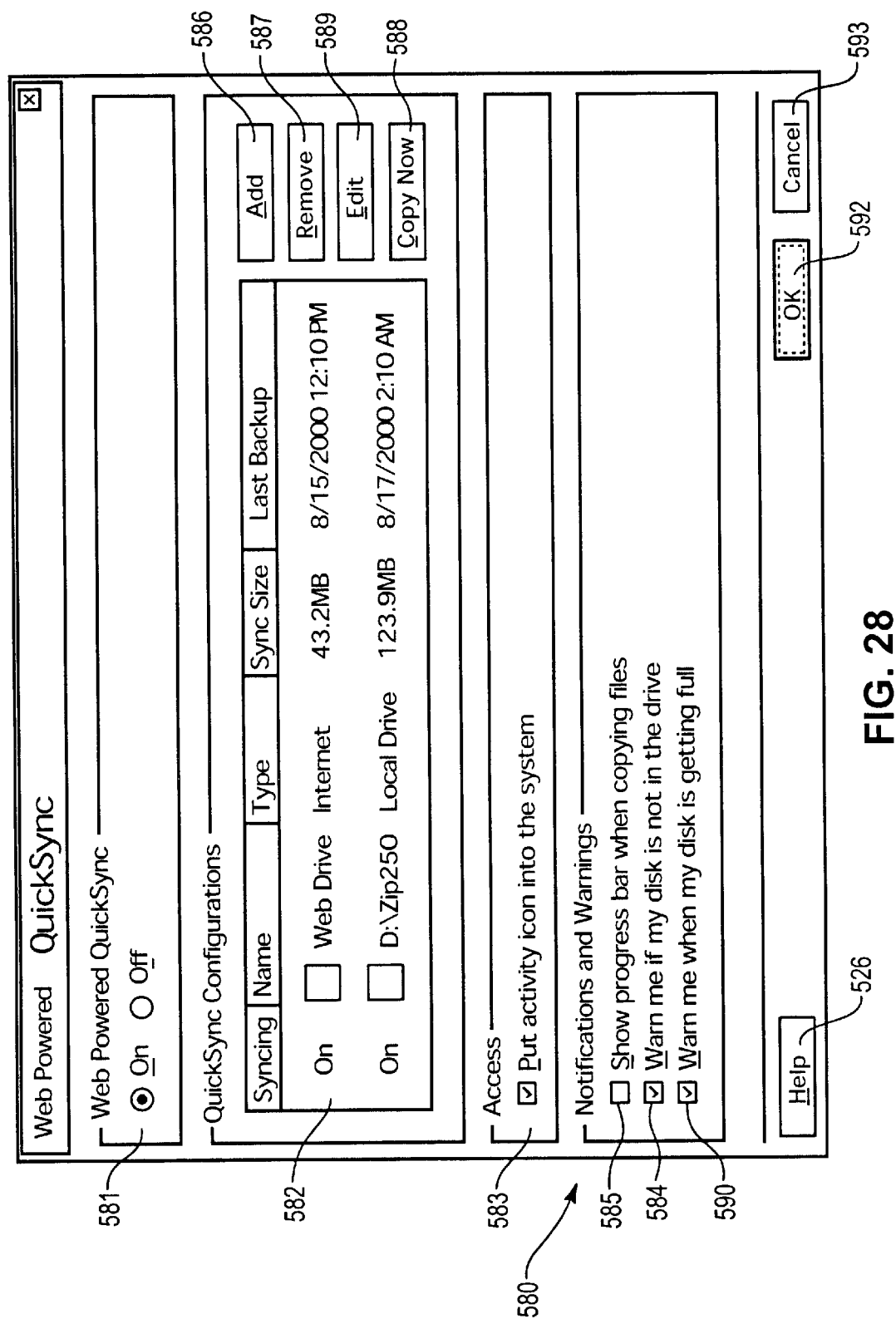
FIGS. 28 and 29 are exemplary screen shots of a user interface for controlling a mirroring application of the present invention.

FIG. 28 is an exemplary screen (580) showing a control panel for the mirroring application of the present invention. As shown in FIG. 28, the screen (580) preferably includes a radio button group (581) with "On" and "Off" selections. By selecting the radio button associated with "On" or "Off," the user can turn the mirroring function of the mirroring application on or off. If the mirroring function is turned off, the application will not automatically mirror changes to the designated source data to the designated backup destination.

The screen (580) also preferably includes a check box (583) which can be checked or unchecked to, respectively, include or omit an activity icon for the mirroring application in the system tray. An example of this icon is illustrated in FIG. 27 at (573). If this box (583) is checked, the activity icon will be provided in the system tray for accessing the mirroring application. If the box (583) is unchecked, the icon will not be provided in the system tray.

The screen (580) also preferably includes a number of check boxes for notifications and warnings that might be provided by the mirroring application. For example, one check box (585) might allow the user to select whether the mirroring application shows a progress bar when copying files. Another check box (584) allows the user to decide in the mirroring application should warn the user if a specified backup destination disk, i.e. a removable data storage medium, is not in the appropriate drive and therefore nor available as a backup data destination. A final check box (590) may allow the user to have the mirroring application warn the user if a specified destination for backup data is approaching its full storage capacity.

The screen (580) of FIG. 28 also includes a display (582) of the selected destinations or backup data storage locations. In the example shown in FIG. 28, data is being backed up by the mirroring application to a web drive and a local Zip® drive.

A number of buttons are also provided for controlling the destination drives. For example, an "Add" button (586) can be selected to add an additional backup data destination. When the "Add" button (586) is selected, the mirroring application may show a screen such as that of FIG. 26 or FIG. 21 from which the user can select a backup data destination to be added to the list of locations where the designated source data is mirrored.

A "Remove" button (587) can be used to delete a backup data location from the list of locations where the designated source data is mirrored. For example, the user may highlight a current backup destination in the list (582) and then selected the "Remove" button (587). The highlighted backup destination is then removed from the list and the mirroring application no longer mirrors the designated source data to that backup destination.

A "Copy Now" button (588) may also be provided with the screen (580). By selecting the "Copy Now" button (588), the user may initiate an immediate backup of the designated source files and folders to each of the designated backup locations.

When the user is finished controlling the mirroring application through the screen (580), an "OK" button (592) may be selected to accept any changes the user has made to the setting on the screen (580). Alternatively, a "Cancel" button (593) can be selected to void any changes the user has made to the setting on the screen (580).

An "Edit" button (589) is also provided so that the user can edit the parameters by which data is backed up to each of the listed backup data storage locations (582). By highlighting a backup location in the list (582) and selecting the "Edit" button (589), the user can access controls for when and how data is backed up to that location.

Figure 29:
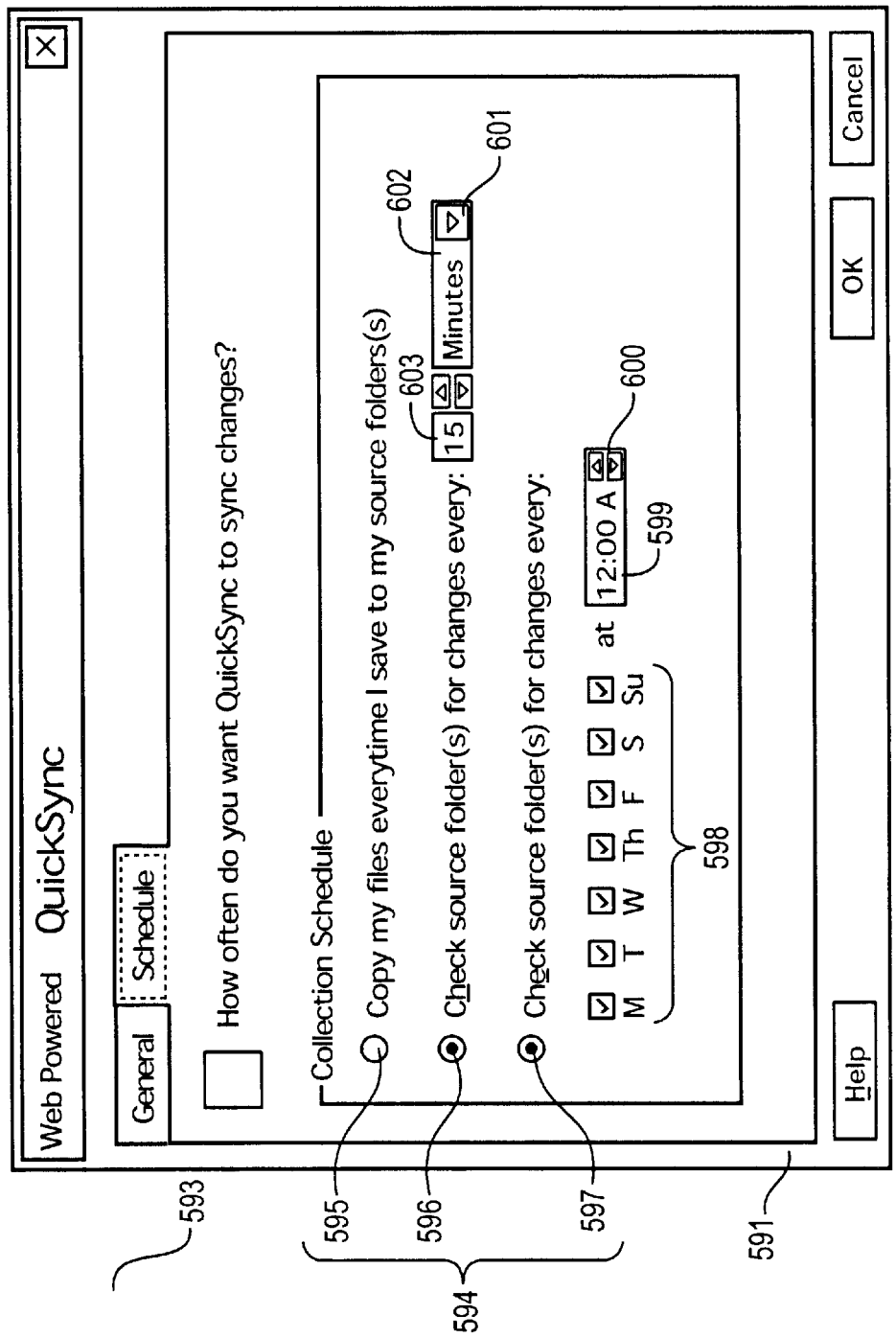

FIG. 29 illustrates an exemplary screen (591) that contains controls for scheduling the monitoring of changes to the specified source files and folders. The screen (591) illustrated in FIG. 29 may be accessed to control each specified backup data location through the "Edit" button (589) of FIG. 28 as described above. Alternatively, the controls of screen (591) may apply to all the specified backup data locations.

As shown in FIG. 29, the user has great flexibility in determining when and how changes to the source data are mirrored to the backup data set. The screen of FIG. 29 preferably includes a set of radio buttons (594). A first radio button (595) allows the user to have the mirroring application mirror the source files and folders every time a file is saved to a designated source folder. A second radio button (596) allows the user to specify that the mirroring application is to check for changes to the data in the source folders at regular intervals. The user can specify the interval, e.g. in minutes, hours, days, etc., by entering a number and time unit fields (602, 603) provided in association with the second radio button (596). These fields may also have pull down menus (601) or increment buttons (604) associated with them to assist the user in entering the desired time interval. A third radio button (597) allows the user to specify that the mirroring application check for changes to the data in the designated source files on a certain day or days of the week and at a particular time of day. Seven check boxes (598) representing each day of the week may be provided to allow the user to check that day or days on which the mirroring application is to check for changed source data. A field (599) is also provided for specifying the time of day at which the check for changed source data is to occur. Increment buttons (600) may be provided for incrementally stepping through the time of day in the appropriate field (599).

In any of these options, the mirroring application with check the specified source folders at the time or interval specified and, upon finding changes to the data, will mirror the changed data to all active backup data locations. In this way, the user has great flexibility to control how frequently his or her data is backed up.

In the foregoing description, it can be seen that the present invention comprises a new and useful data synchronization system comprising a universe defined to include a plurality of nodes, each of which has an agent running thereon, whereby each node is automatically provided with current files/data. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art having the benefit of the teachings of this specification, may effect numerous modifications thereto and changes may be made without departing from the scope and spirit of the invention in its aspects.

What is claimed is:

1. A system for backing up electronic data files, the system comprising:
    a host computer running a mirroring application;
    a connection between the host computer and the Internet; and
    a user interface of said mirroring application, wherein said user interface includes controls for specifying source data;
    wherein said mirroring application monitors said source data for change and, upon detecting changes to said source data, automatically copies said source data to a backup data storage location accessed by said host computer via the Internet.

2. The system of claim 1, wherein said mirroring application, upon detecting changes to said source data, also copies said source data to a local backup data storage location.

3. The system of claim 2, wherein said local backup data storage location is a removable storage media in a removable storage media drive.

4. The system of claim 2, wherein said local backup data storage location is a hard drive in said host computer or in a computer networked to said host computer.

5. The system of claim 2, wherein said user interface includes controls for specifying said local backup data storage location.

6. The system of claim 5, wherein said user interface specifies an available storage capacity of said local backup data storage location.

7. The system of claim 1, wherein said user interface includes schedule controls for specifying how often said mirroring application checks said source data for change and, upon detecting changes to said source data, copies said source data to said backup data storage location accessed via the Internet.

8. The system of claim 7, wherein said schedule controls include controls for specifying a time interval at which said mirroring application checks said source data for change and, upon detecting changes to said source data, copies said source data to said backup data storage location accessed via the Internet.

9. The system of claim 7, wherein said schedule controls include controls for specifying at least one day of the week and time of day at which said mirroring application checks said source data for change and, upon detecting changes to said source data, copies said source data to a backup data storage location accessed via the Internet.

10. A system for backing up electronic data files, the system comprising:
    a host computer running a mirroring application; and
    a user interface of said mirroring application, wherein said user interface includes controls for specifying source data;
    wherein said mirroring application monitors said source data for change and, upon detecting changes to said source data, automatically copies said source data to two or more backup data storage locations.

11. The system of claim 10, wherein said user interface of said mirroring application includes controls for specifying said two or more backup data storage locations.

12. The system of claim 10, wherein said host computer includes a connection to the Internet; and at least one of said backup data storage locations is accessed via the Internet.

13. The system of claim 10, wherein one of said backup data storage locations is a removable storage media in a removable storage media drive.

14. The system of claim 10, wherein one of said backup data storage locations is a hard drive in said host computer or in a computer networked to said host computer.

15. The system of claim 10, wherein said user interface specifies an available storage capacity of available backup data storage locations.

16. The system of claim 10, wherein said user interface includes schedule controls for specifying how often said mirroring application checks said source data for change and, upon detecting changes to said source data, copies said source data to said backup data storage locations.

17. The system of claim 16, wherein said schedule controls include controls for specifying a time interval at which said mirroring application checks said source data for change and, upon detecting changes to said source data, copies said source data to said backup data storage locations.

18. The system of claim 16, wherein said schedule controls include controls for specifying at least one day of the week and time of day at which said mirroring application checks said source data for change and, upon detecting changes to said source data, copies said source data to said backup data storage locations.

19. A mirroring application for backing up electronic data files, the application being written to run on a host computer with a connection between the host computer and the Internet, said application comprising:
- a mirroring function for mirroring specified source data to a backup data storage location; and
- a user interface, wherein said user interface includes controls for specifying said source data by file or folder;
- wherein said mirroring application monitors said source data for change and, upon detecting changes to said source data, automatically copies said source data to said backup data storage location; and
- wherein said backup data storage location is accessed via the Internet.

20. The application of claim 19, wherein said mirroring application, upon detecting changes to said source data, also copies said source data to a local backup data storage location.

21. The application of claim 20, wherein said user interface includes controls for specifying said local backup data storage location.

22. The application of claim 20, wherein said user interface specifies an available storage capacity of said local backup data storage location.

23. The application of claim 19, wherein said user interface includes schedule controls for specifying how often said mirroring application checks said source data for change and, upon detecting changes to said source data, copies said source data to said backup data storage location accessed via the Internet.

24. The application of claim 23, wherein said schedule controls include controls for specifying a time interval at which said mirroring application checks said source data for change and, upon detecting changes to said source data, copies said source data to said backup data storage location accessed via the Internet.

25. The application of claim 23, wherein said schedule controls include controls for specifying at least one day of the week and time of day at which said mirroring application checks said source data for change and, upon detecting changes to said source data, copies said source data to a backup data storage location accessed via the Internet.

26. A mirroring application for backing up electronic data files, the application being written to run on a host computer, said application comprising:
- a mirroring function for mirroring specified source data to a backup data storage location; and
- a user interface, wherein said user interface includes controls for specifying said source data by file or folder;
- wherein said mirroring application monitors said source data for change and, upon detecting changes to said source data, automatically copies said source data to two or mare backup data storage locations.

27. The application of claim 26, wherein said user interface of said mirroring application includes controls for specifying said two or more backup data storage locations.

28. The application of claim 26, wherein said host computer includes a connection to the Internet and at least one of said backup data storage locations is accessed via the Internet.

29. The application of claim 26, wherein one of said backup data storage locations is a removable storage media in a removable storage media drive.

30. The application of claim 26, wherein one of said backup data storage locations is a hard drive in said host computer or in a computer networked to said host computer.

31. The application of claim 26, wherein said user interface specifies an available storage capacity of available backup data storage locations.

32. The application of claim 26, wherein said user interface includes schedule controls for specifying how often said mirroring application checks said source data for change and, upon detecting changes to said source data, copies said source data to said backup data storage locations.

33. The application of claim 32, wherein said schedule controls include controls for specifying a time interval at which said mirroring application checks said source data for change and, upon detecting changes to said source data, copies said source data to said backup data storage locations.

34. The application of claim 32, wherein said schedule controls include controls for specifying at least one day of the week and time of day at which said mirroring application checks said source data for change and, upon detecting changes to said source data, copies said source data to said backup data storage locations.

35. A method for backing up electronic data files with a mirroring application running on a host computer connected to the Internet said method comprising:
- specifying source data by tile or folder with a user interface;
- monitoring said source data for change; and,
- upon detecting changes to said source data, automatically copying said source data to a backup data storage location accessed by said host computer via the Internet.

36. The method of claim 35, further comprising, upon detecting changes to said source data, also copying said source data to a local backup data storage location.

37. The method of claim 35, further comprising specifying said local backup data storage location.

38. The method of claim 35, further comprising specifying how often said monitoring step is performed.

39. The method of claim 38, further comprising specifying at least one day of the week and time of day at which said monitoring step is performed.

40. A method for backing up electronic data files with a mirroring application running on a host computer, said method comprising:
- specifying source data by file or folder with a user interface;
- monitoring said source data for change; and,
- upon detecting changes to said source data, automatically copying said source data to two or more backup data storage locations.

41. The method of claim 40, further comprising specifying said two or more backup data storage locations.

42. The method of claim 40, further comprising specifying how often said monitoring step is performed.

43. The method of claim 42, further comprising specifying at least one day of the week and time of day at which said monitoring is performed.

* * * * *